United States Patent
Kulkarni et al.

(10) Patent No.: US 12,502,911 B2
(45) Date of Patent: Dec. 23, 2025

(54) CONVERTIBLE E-AXLE FOR INDEPENDENT AND RIGID SUSPENSION SYSTEMS

(71) Applicant: Dana Automotive Systems Group, LLC, Maumee, OH (US)

(72) Inventors: Durganand Kulkarni, Pune (IN); Maruti Gaikwad, Pune (IN); Sandeep Bhagoji Patil, Pune (IN); Sagar Vangikar, Pune (IN)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/625,382

(22) Filed: Apr. 3, 2024

(65) Prior Publication Data
US 2025/0313040 A1 Oct. 9, 2025

(51) Int. Cl.
*B60B 35/16* (2006.01)

(52) U.S. Cl.
CPC ........ *B60B 35/16* (2013.01); *B60B 2310/302* (2013.01)

(58) Field of Classification Search
CPC .. B60B 35/16; Y10T 74/2188; B60G 2206/31
See application file for complete search history.

(56) References Cited

U.S. PATENT DOCUMENTS

| | | | | |
|---|---|---|---|---|
| 805,567 | A * | 11/1905 | Lindsay | F16H 48/08 475/230 |
| 1,076,559 | A * | 10/1913 | Duffy | B60B 35/16 180/905 |
| 1,164,915 | A * | 12/1915 | Bower | B60B 35/16 74/607 |
| 3,025,716 | A * | 3/1962 | Muller | F16H 57/0482 277/575 |
| 3,041,890 | A * | 7/1962 | O'Brien | B60B 35/18 74/607 |
| 4,787,267 | A * | 11/1988 | Kessler | F16H 57/021 74/606 R |
| 6,729,207 | B2 * | 5/2004 | Allmandinger | F16H 57/03 74/607 |
| 7,137,183 | B2 | 11/2006 | Stuart et al. | |
| 8,764,601 | B2 * | 7/2014 | Martin, III | F16H 48/24 475/230 |

FOREIGN PATENT DOCUMENTS

WO 03080366 A2 10/2003

* cited by examiner

*Primary Examiner* — Thomas C Diaz
(74) *Attorney, Agent, or Firm* — McCoy Russell LLP

(57) ABSTRACT

An axle assembly comprising: a central cover; a first beam; a second beam; a first wheel flange; and a second wheel flange; where the first beam and the second beam join to the central cover via welding, where a first shaft received via the first wheel flange is positioned along the first beam and is not covered by housing between the first wheel flange and a differential assembly, where the first beam and the second beam have a uniform cross-section lengthwise.

20 Claims, 11 Drawing Sheets

CONVERTIBLE E-AXLE FOR INDEPENDENT AND RIGID SUSPENSION SYSTEMS

TECHNICAL FIELD

The present description relates a rigid suspension system and axle.

BACKGROUND AND SUMMARY

Vehicles, such as electrified vehicles, may have a transmission to switch gears of a plurality different ratios, where each of the different ratios may output different torques and rotational speeds with the same input torque. Likewise, vehicles may have a plurality of axle assemblies including axles. Electrification of a vehicle may include drive coupling an output of an electric machine to a differential gearset housed in a differential housing of an axle assembly. Additionally, drive coupling the output of the electric machine to the differential gearset may enable functionality for the vehicle such as a four-wheel drive or an all-wheel drive. To increase the torque to a differential, or to increase the amount of speeds and/or gear ratios available to an axle, a transmission may be drive coupled to the differential gearset housed in the differential housing. An axle assembly may be electrified, have torque input increased, and have additional speeds added via drive coupling an electric machine to the differential gearset via a transmission. The output from the electric machine may drive couple an input to the transmission, such as a drivehead, to drive couple the transmission gearset. The output of the transmission may drive couple to or be the input to the differential gearset. Some axle assemblies and their complementary axles may be designed specifically for independent suspension systems. Such axle assemblies may include banjo housing for as housing for the axles.

Modifying banjo and other axle housing systems is challenging. Components of a banjo housing or another housing may have to be retooled, re-stamped, or have components and features replaced to allow an output of an electric machine or a transmission to drive couple the differential gearset of the axle. Likewise, a banjo housing or another housing may have to be retooled, re-stamped, have components and features replaced, or have additional components and features mounted to allow for an electric motor or a transmission to be mounted or fixed by other means to the axle system. Modifications may increase scrap during manufacturing. Modifications that include adding components may also increase weight of an assembly.

The inventors herein have recognized these and other issues with such systems and have developed a way to at least partially solve them. As developed in one example is an axle assembly comprising: a central cover; a first beam; a second beam; a first wheel flange; and a second wheel flange; where the first beam and the second beam join to the central cover, where a first shaft received via the first wheel flange is positioned along the first beam and is not fully covered by housing between the first wheel flange and a differential assembly, where the first beam and the second beam have a uniform cross-section lengthwise.

The beams of the axle assembly may be prefabricated beams, such as I-beams, that may not need to be machined, molded, or stamped into a shape to support the axle half shafts. A gearbox incorporating a drivehead may be drive coupled to a differential. The gearbox may have a housing, where the gearbox housing may receive a drivehead that drive couples the gearsets and/or other reduction ratios of the gearbox. The gearbox housing may physically couple to a centrally located plate or cover. The gearbox housing may physically couple to the centrally located cover via fastening. For example, the gearbox housing may have a first flange and the centrally located cover may have a second flange, where the first flange and the second flange may have surface sharing contact and be fastened via a plurality of fasteners, such as bolts. The fasteners may be fit to complementary passages, such as holes, of the first flange and the second flange. The gearbox housing may receive the axle half shafts of the axle assembly, such as via a pair of tubes. When received by the gearbox housing, the axle half shafts may drive couple the differential gearset of a differential assembly. The differential gearset may be housed in a cavity of a differential housing (such as a differential carrier) of the differential assembly. The differential housing may include the gearbox housing and the centrally located cover, where the gearbox housing and centrally located cover may enclose the differential gearset and create the cavity. The wheel flanges may be physically coupled to the beams, such as via joining via a joint, such as via welding. The wheel flanges may be machined after being physically coupled to the beams. Each of the wheel flanges may receive and support an axle half shaft. The gearbox, the differential housing, and each of the wheel flanges may be fluidly sealed and lubricated separately. The first axle half shaft and the second axle half shaft may not be housed by the beams or a half shaft housing of the axle assembly. Portions of the first axle half shaft and second axle half shaft that are not received and housed by the gearbox housing, differential housing, or the wheel flanges may be exposed to the exterior of the axle assembly and may not receive lubrication. Without machining the centrally located plate, the differential housing, and/or the beams for electrification, scrap may be reduced compared to electrification conversions of axles of the art. Without additional components or features included the drivehead, the weight may be reduced compared to other electrification conversions of axles of the art. The use of beams as opposed to a banjo or another housing, not fully covering the axle shafts with a material, and immersing less of the axle shafts in lubricant, may further reduce the weight of the axle assembly compared to axle assemblies of the art.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
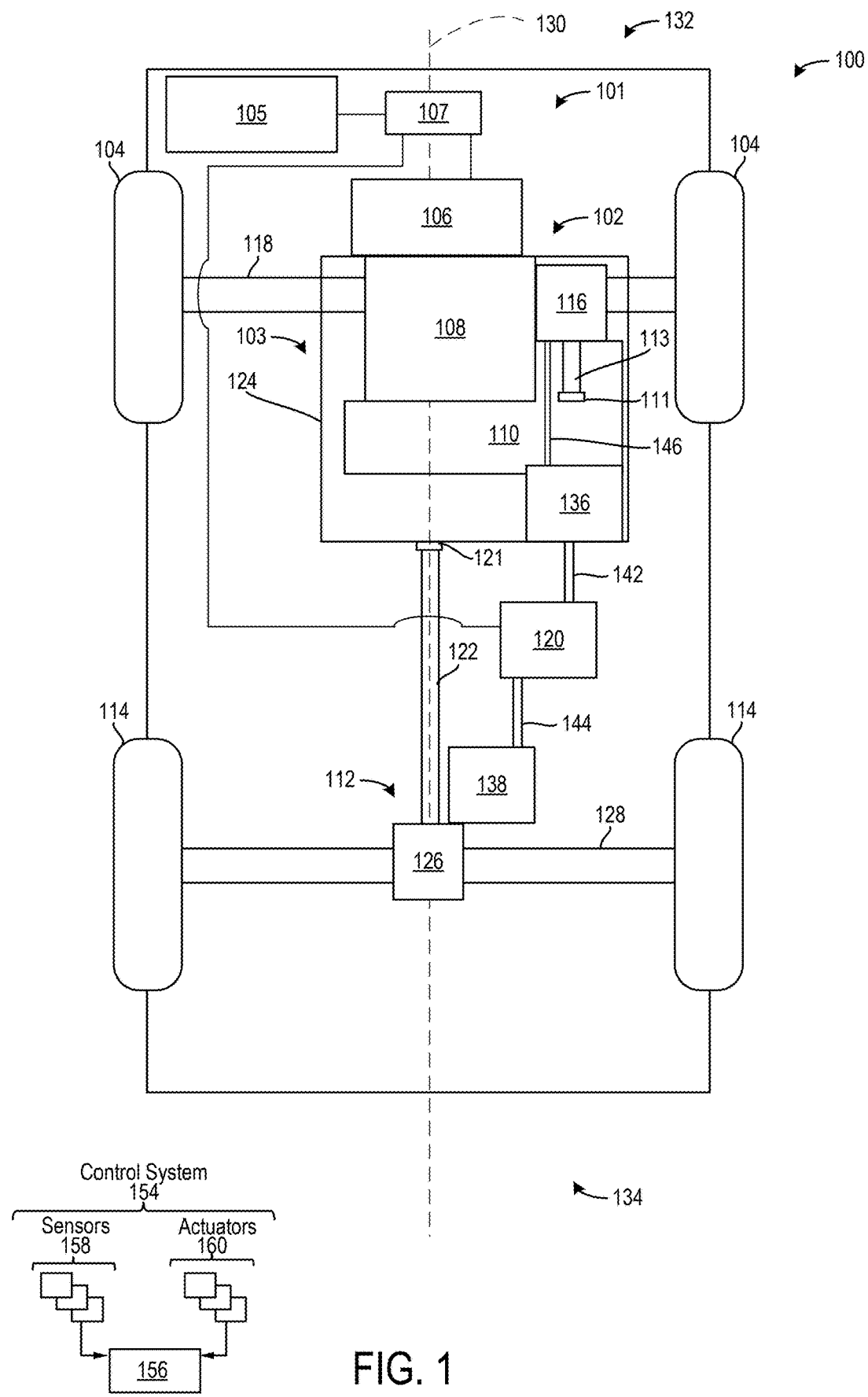
FIG. 1 shows an example schematic of a vehicle which may include the transmission/gearbox of the present disclosure.

The following description relates to a method of manufacture for an axle system, incorporating a convertible e-axle and independent suspension system. By incorporating a convertible e-axle, the axle system may convert an independent transmission, such as a gearbox, into a rigid axle. The transmission/gearbox may be of a drivehead configuration, incorporating a drivehead. When assembled into the axle system, the transmission/gearbox may be complementary to and drivingly couple a differential that distributes torque to a pair of axle half shafts of the axle system.

The axle system is an axle assembly that is of a beam axle configuration, where two beams are used to mechanically support a first axle half shaft, a second axle half shaft, and complementary features of each axle half shaft including wheel hubs and brake flanges. A differential assembly that includes the transmission/gearbox and the differential may be fluidly sealed from the exterior of the axle system. Likewise, a first brake flange, complementary to the first axle half shaft, and a second brake flange, complementary to the second axle half shaft, may fluidly sealed from the exterior of the axle system. The housing of the differential assembly, the first brake flange, and the second brake flange may be greased and sealed, sealing lubricant from the exterior of the axle system. The portions of the first axle half shaft, the second axle half shaft, and the first and second beams may not be fluidly sealed and may be open to the exterior of the axle system.

The first beam and second beam may physically couple to a first housing component of a differential carrier via a first set of joints. The first brake flange and the second flange may physically couple to the first and second beams, respectively, via a second set of joints. The first beam and second beam may physically couple to a first housing component of the differential carrier via the first joints through a joining technique, such as via welding. Likewise, the first brake flange and second brake flange may physically couple to the first beam and second beam, respectively, via the second joints through joining technique, such as via welding. After physically coupling via the second joints, the first and second flanges are machined to incorporate features holes, passages, volumes, and other features for receiving and housing fasteners, axle half shafts, bearings, seals, and braking components. The transmission/gearbox, including the drivehead, may be mounted to the first housing component at a flange. The transmission/gearbox may incorporate a second housing component for the differential gearset, that may physically couple the flange and, with the first housing component, enclose the differential gearset.

For an example, the first beam and second beam may be I-beams. For another example the first beam and second beam may be another rigid beam available from the market, such as a C-beam. The first and second beams may not be hollow. The first and second beams may not have passages or volumes for housing fluid and/or for receiving moving components, such as the first and second axle half shafts.

Without machining to the centrally located plate, the differential housing, and/or the beams for electrification, scrap may be reduced compared to electrification conversions of axles of the art. Without additional components or features to include the drivehead, the weight may be reduced compared to other electrification conversions of axles of the art. The use of beams as opposed to a banjo or another housing of the art, not covering the axle shafts with a material, and immersing less of the axle shafts in lubricant, may further reduce the weight of the axle assembly compared to axle assemblies of the art.

Figure 2:
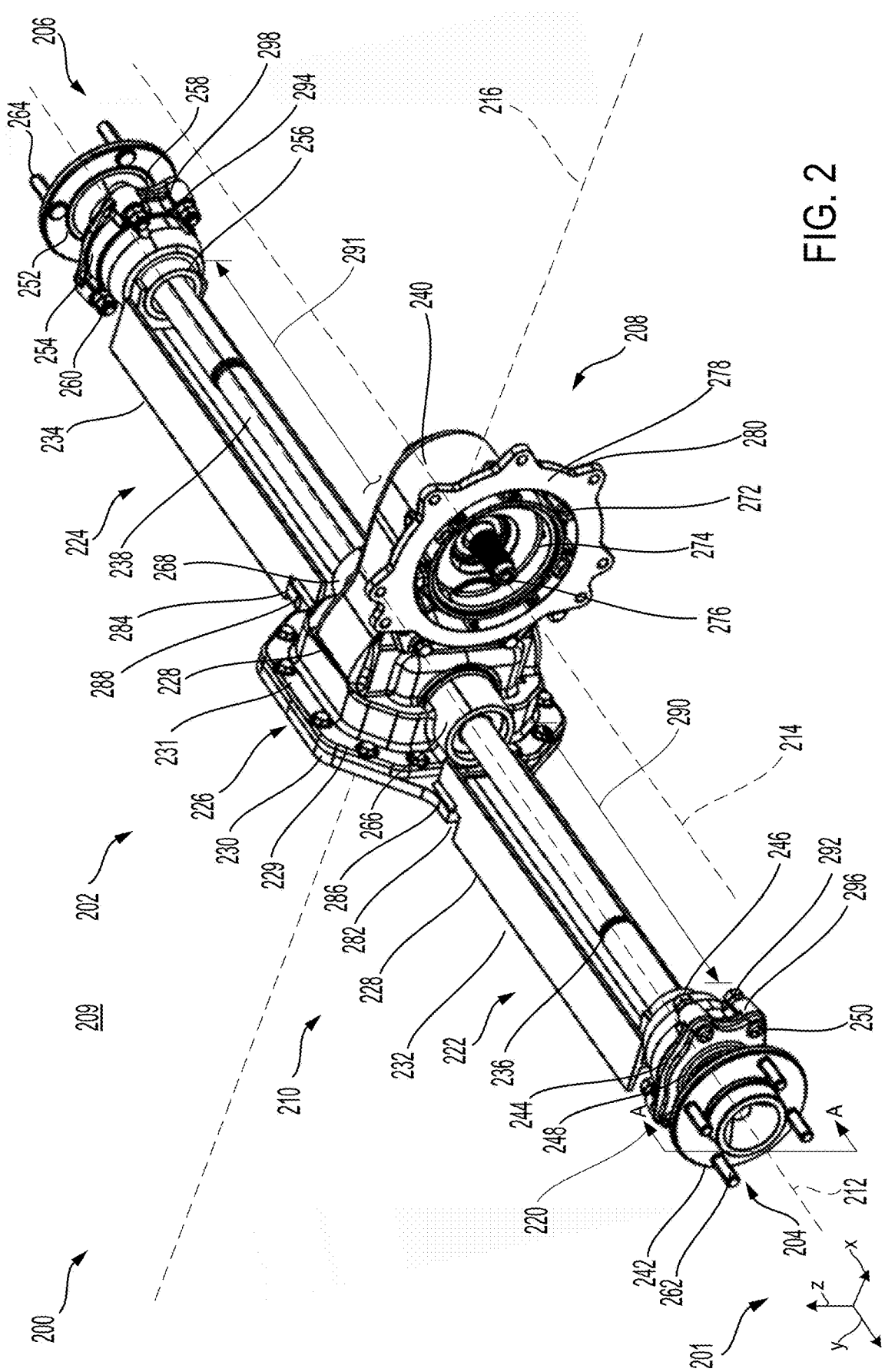
FIG. 2 shows a side view of an example of an axle assembly of the present disclosure.
Figure 3:
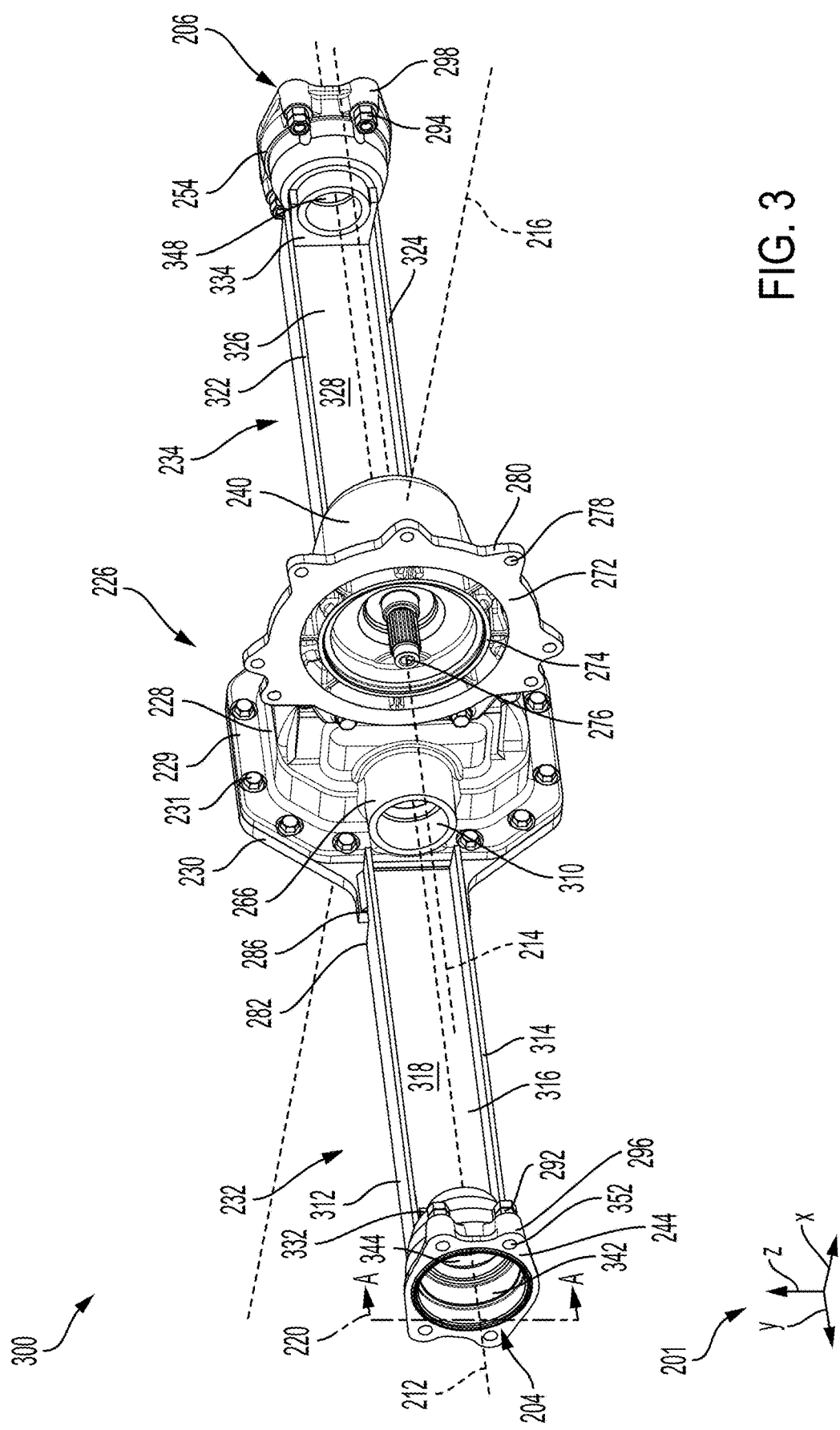
FIG. 3 shows a side view of the example axle assembly without the axle half shafts and wheel hubs.
Figure 4:
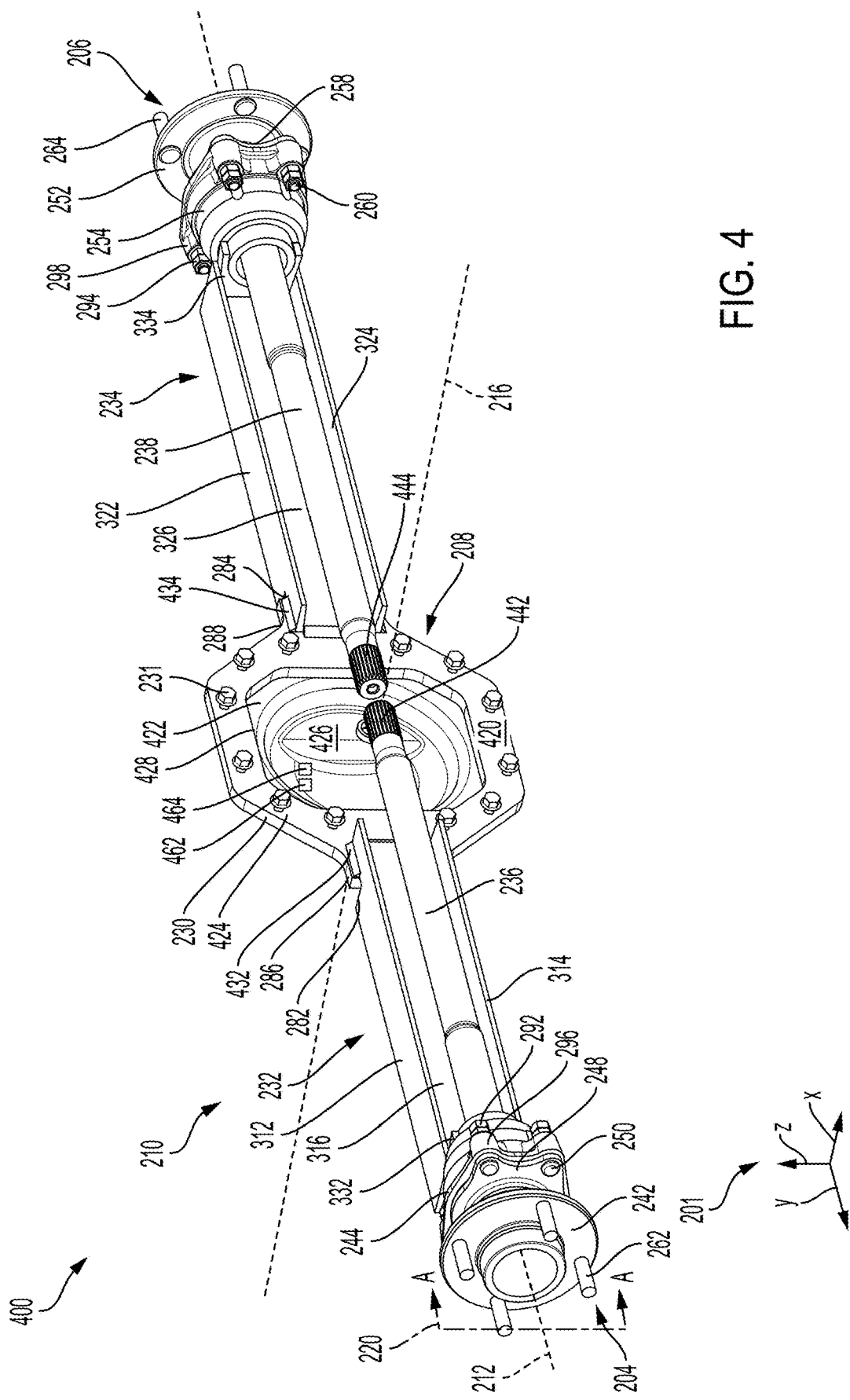
FIG. 4 shows a side view of the example axle assembly without a drivehead and the transmission/gearbox.
Figure 5:
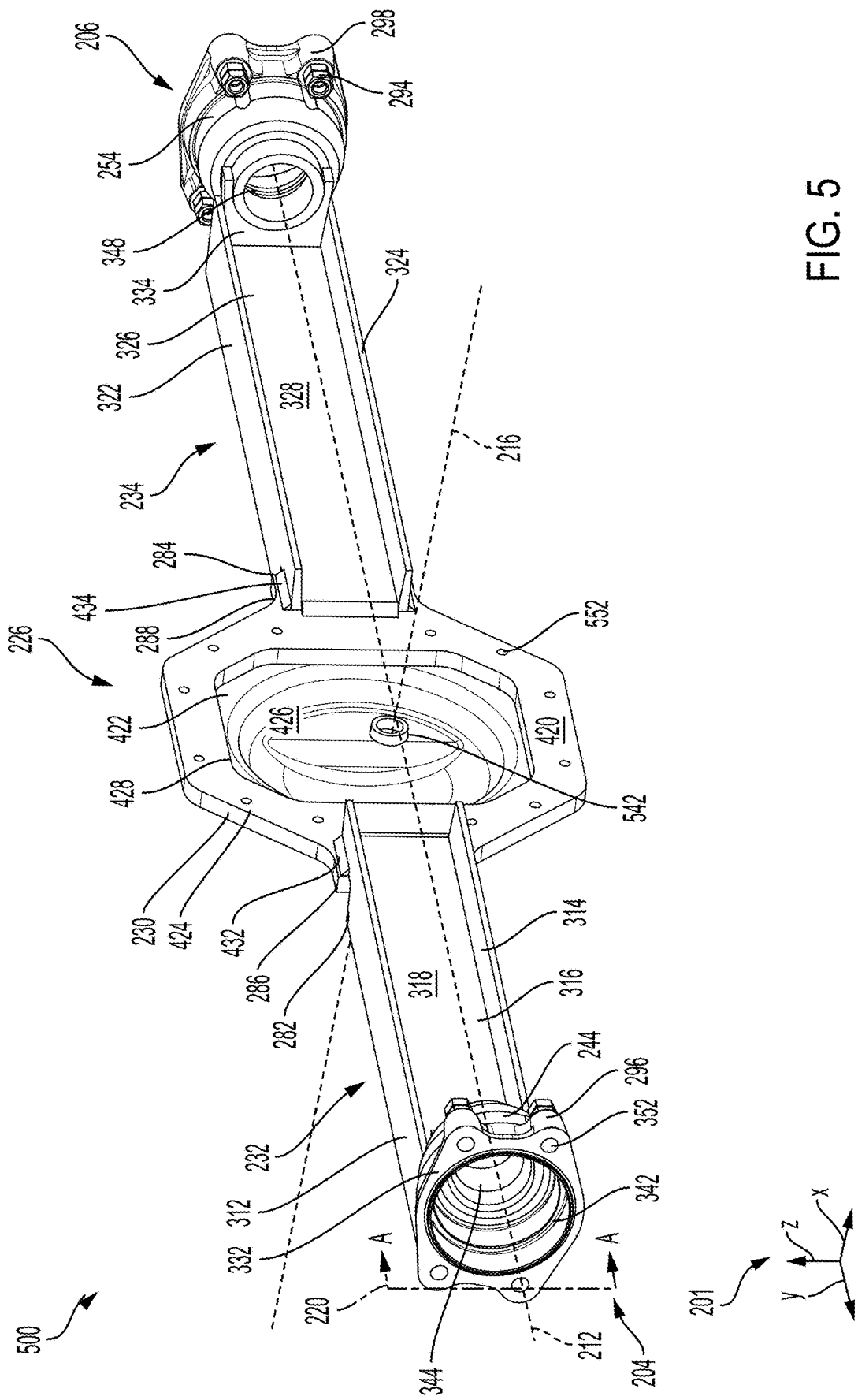
FIG. 5 shows a side view of the example axle assembly without the axle half shafts, the wheel hubs, the drivehead, or the transmission/gearbox.
Figure 6:
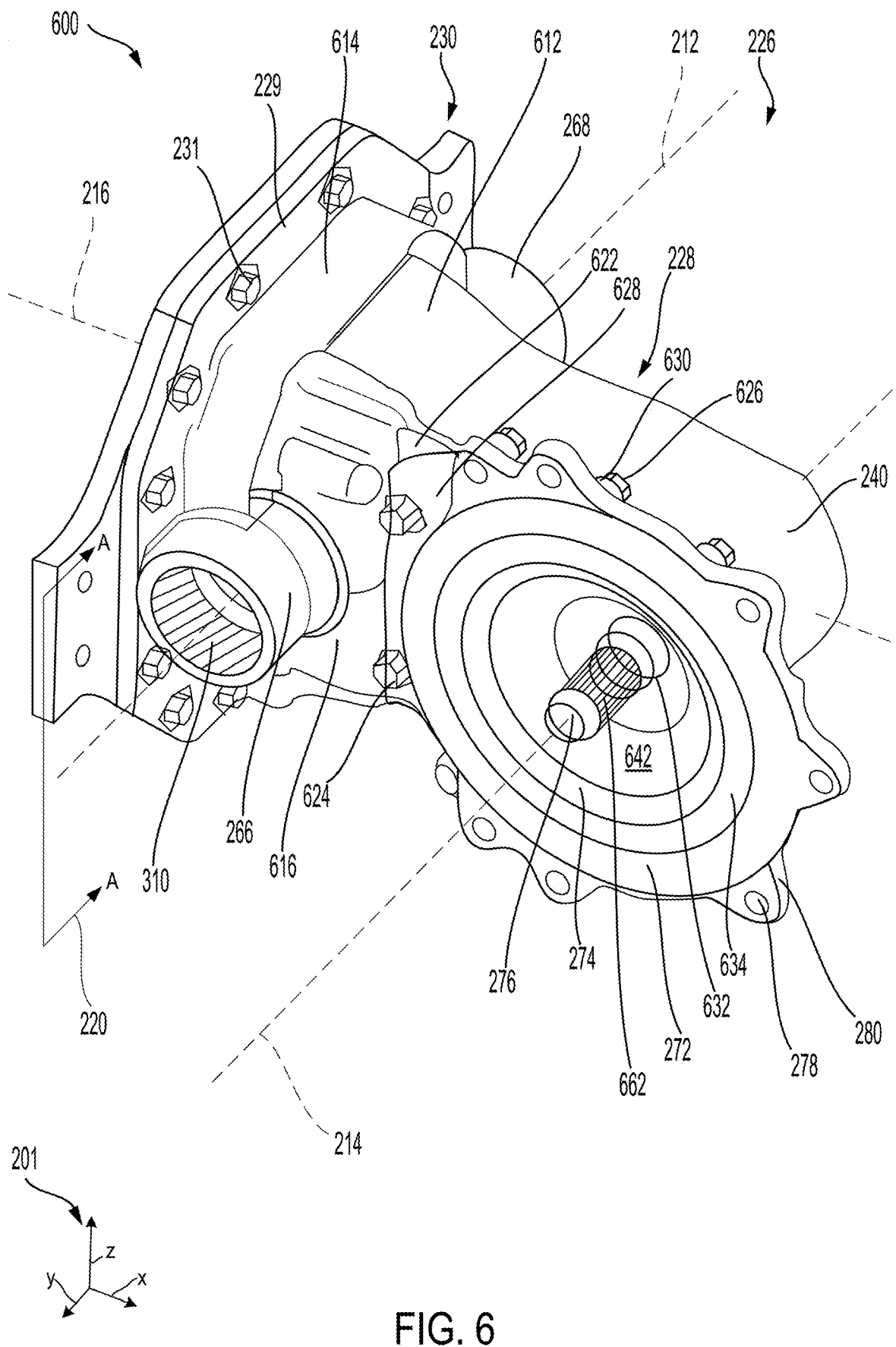
FIG. 6 shows a side view of the differential housing.
Figure 7:
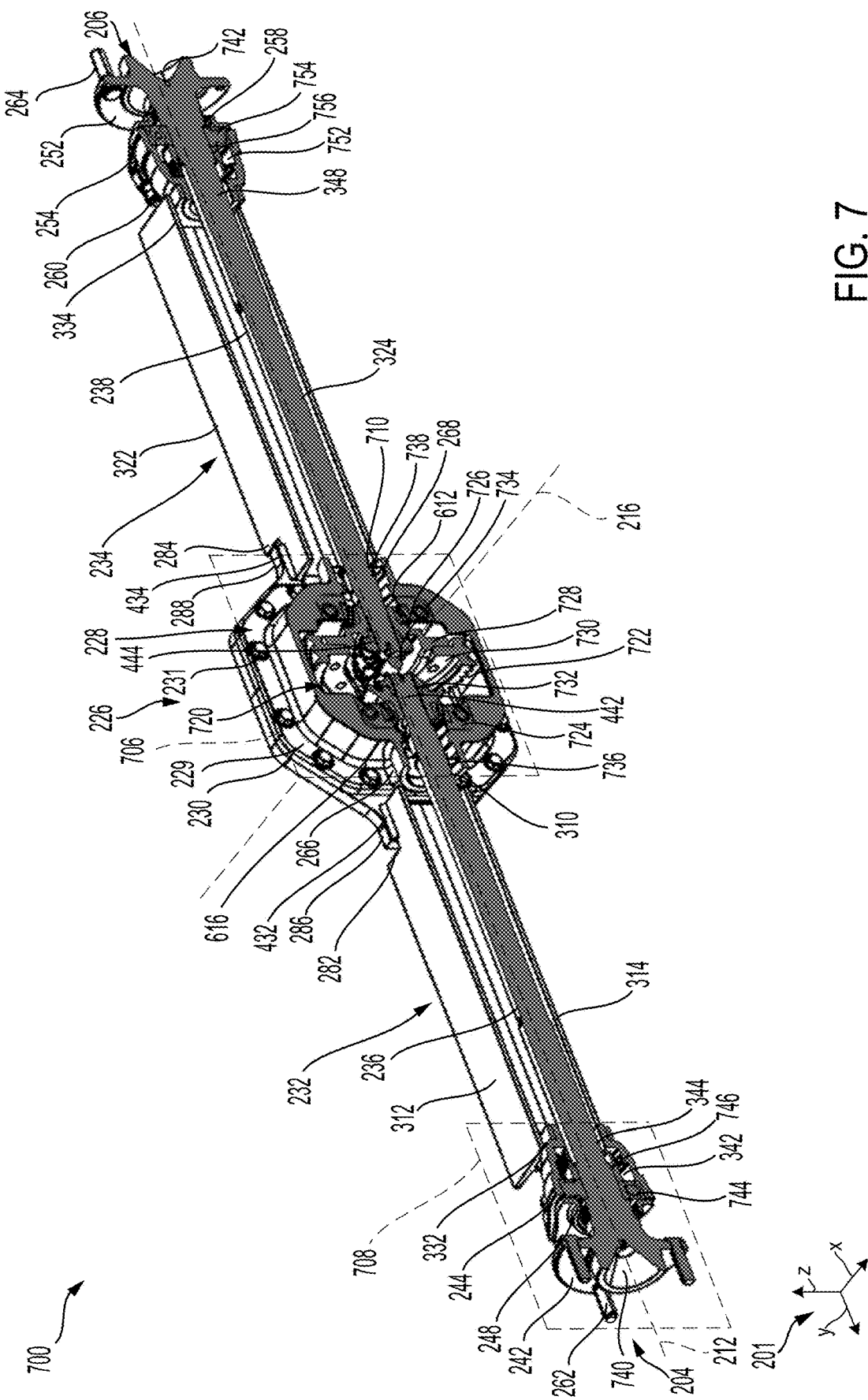
FIG. 7 shows a sectional view of the example axle assembly.
Figure 8:
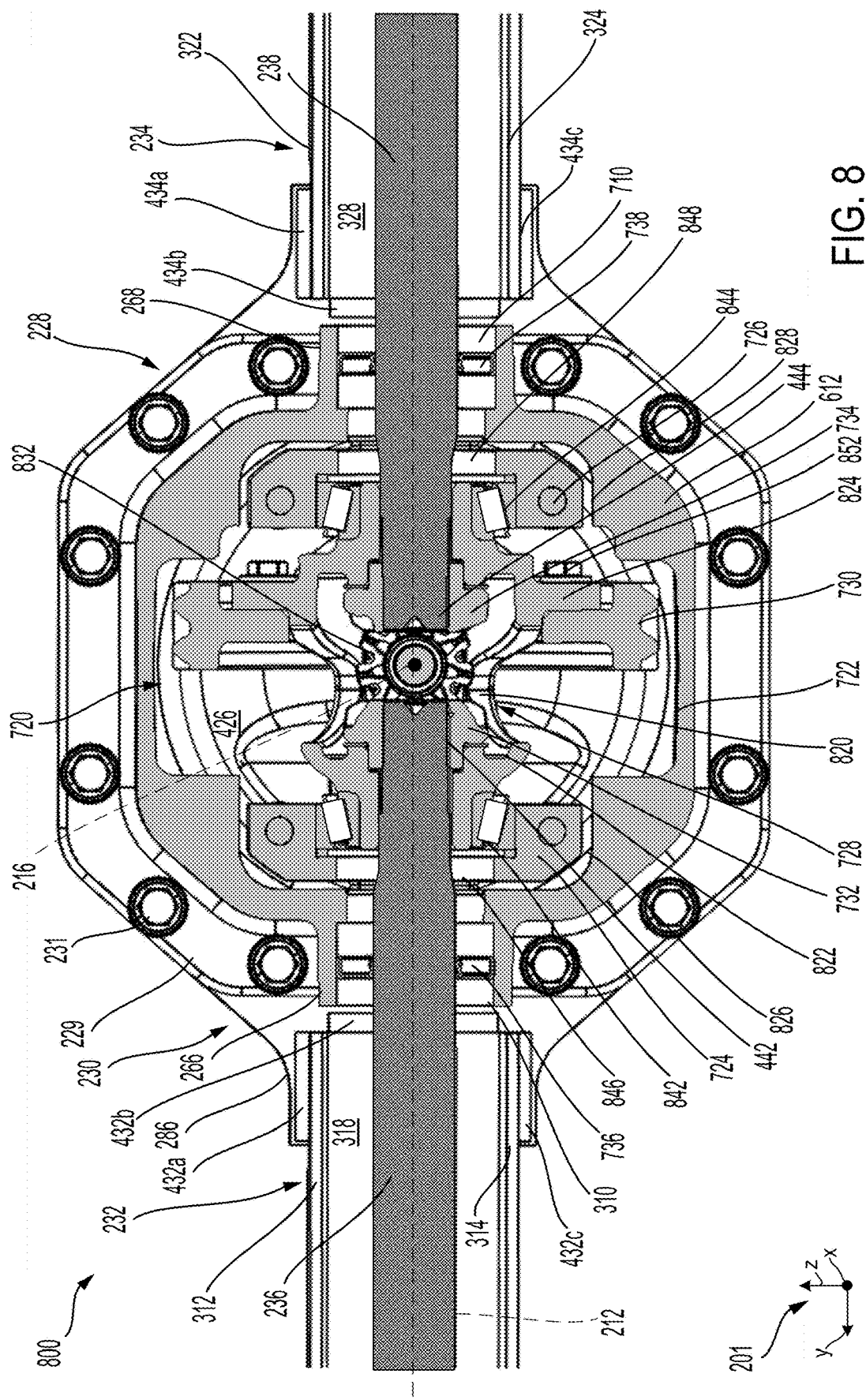
FIG. 8. shows a sectional view of the differential housing and a differential gearset attached to the axle assembly.
Figure 9:
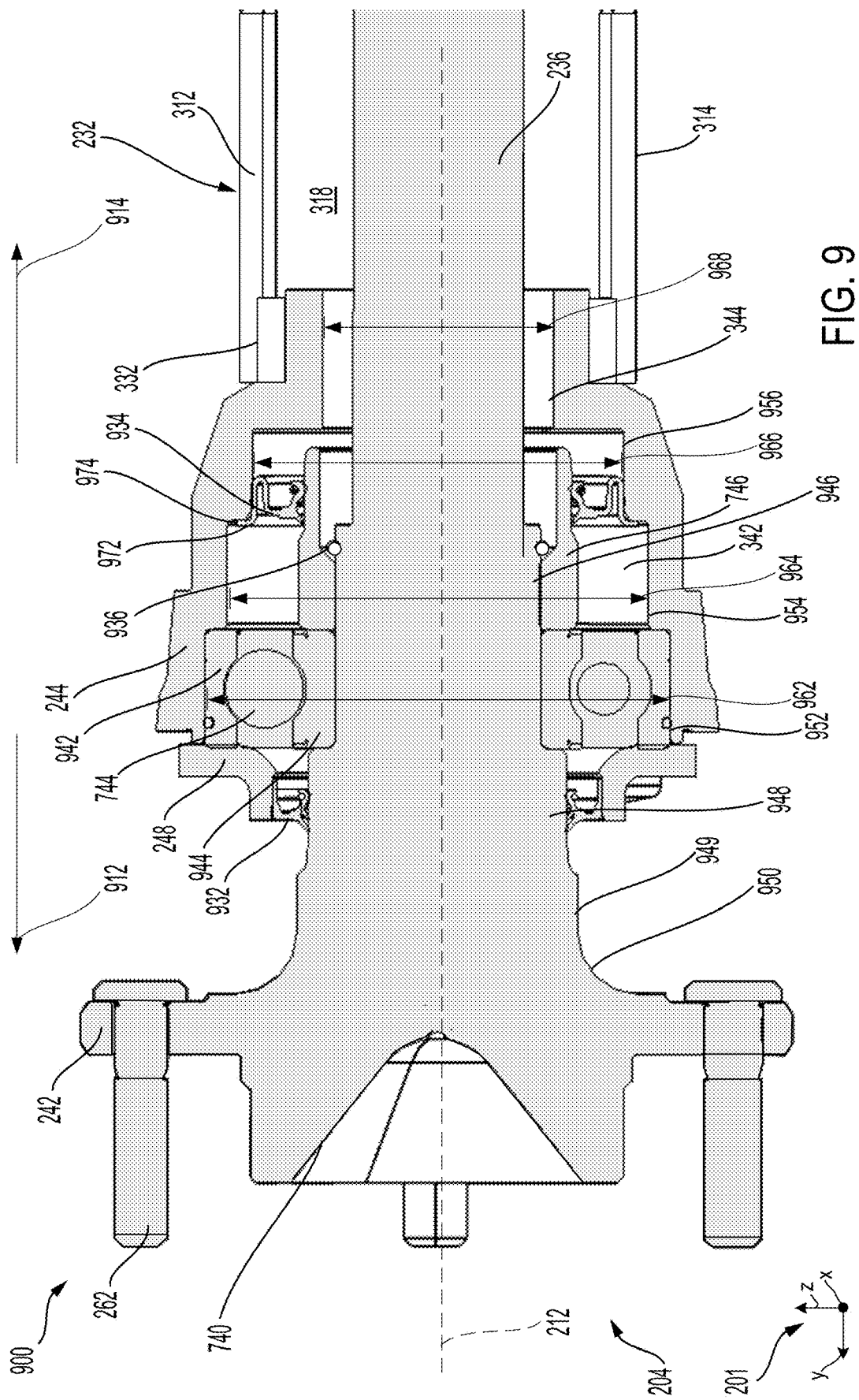
FIG. 9 shows a sectional view of a wheel hub and a brake flange attached to the axle assembly.
Figure 10:
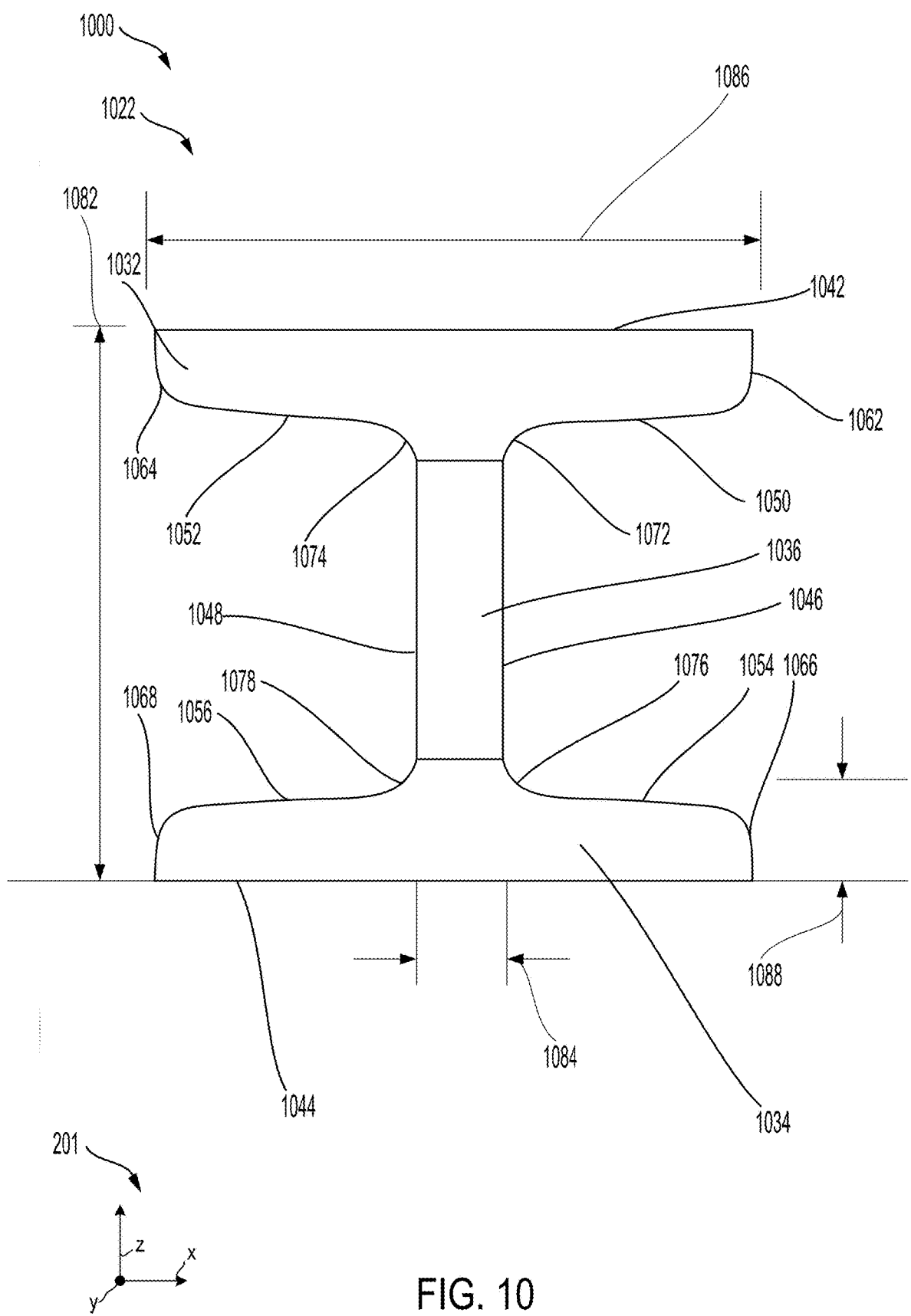
FIG. 10 shows a sectional view of a beam of the example axle assembly.
Figure 11:
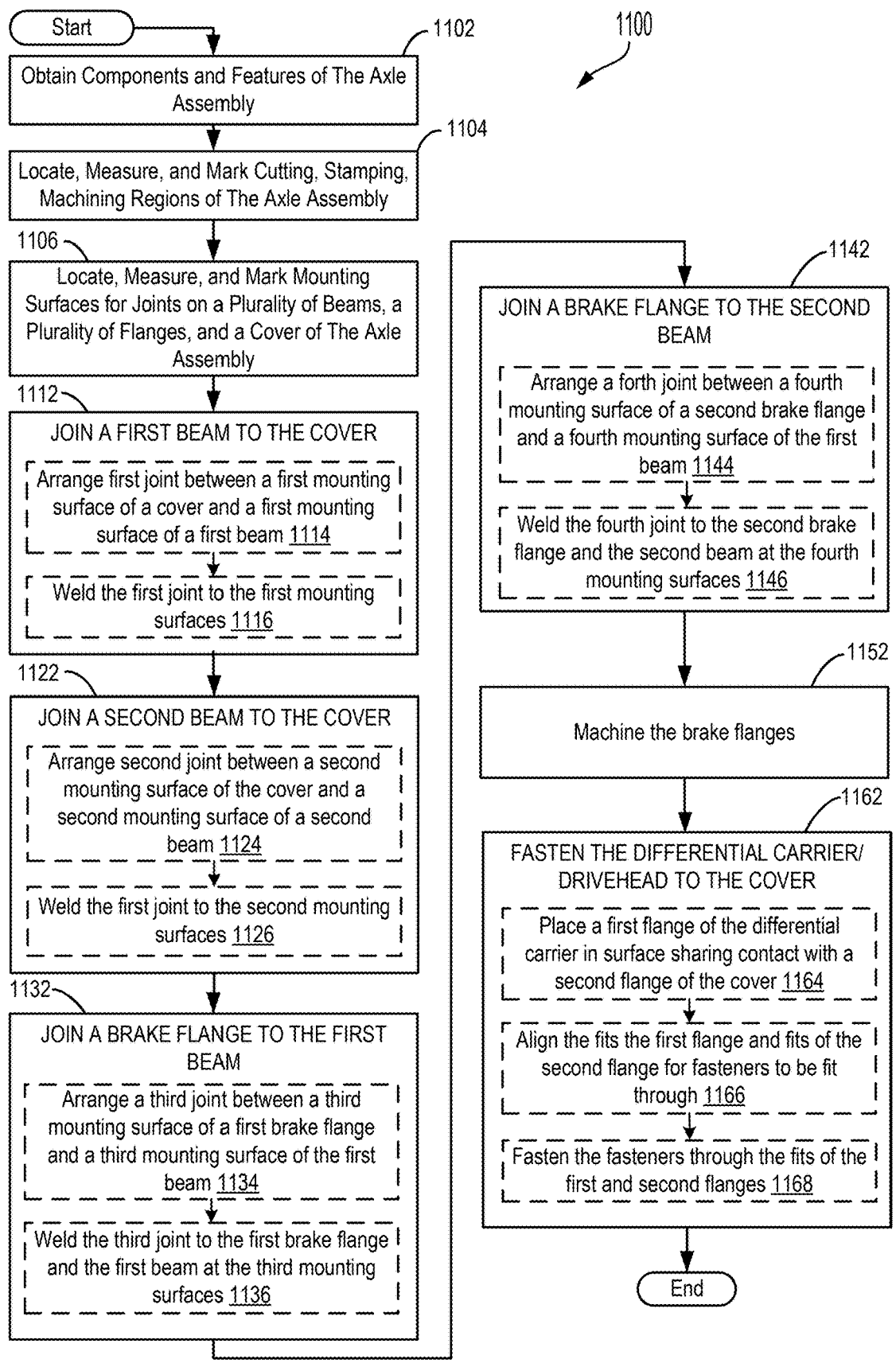
FIG. 11 shows a method to manufacture the example axle assembly.

FIG. 1 shows an example schematic of a vehicle which may include the transmission of the present disclosure. The vehicle in FIG. 1 may be an electrified vehicle such as an EV or a hybrid vehicle with multiple sources of torque, where at least a source of torque may include an electric motor, a hydrogen fuel cell, and/or a mover that is not an internal combustion engine (ICE). FIG. 1 shows an example schematic of a vehicle which may include the transmission of the present disclosure. FIG. 1 shows an example schematic of a vehicle which may include the transmission of the present disclosure. FIG. 2 shows a side view of an example of an axle assembly of the present disclosure. The axle assembly of FIG. 2 may include a first axle half shaft and second axle half shaft, complementary wheel hubs and brake flanges for the first and second axle half shafts, a first beam and a second beam, a differential housing comprising a transmission/gearbox that may be or include a drivehead. FIG. 3 shows a side view of the example axle assembly without the axle half shafts and wheel hubs. FIG. 4 shows a side view of the example axle assembly without a drivehead and the transmission/gearbox. FIG. 5 shows a side view of the example axle assembly without the axle half shafts, the wheel hubs, the drivehead, or the transmission/gearbox. FIG. 6 shows a side view of the differential assembly and differential housing including the drivehead. The side view of FIG. 6 shows the differential assembly separated from the other components and features of the axle assembly. FIG. 7 shows a sectional view of the example axle assembly. FIG. 8. shows a sectional view of differential housing attached to the axle assembly. The differential housing receives and the differential gearset drivingly couples to the first and second axle half shafts in FIG. 8. FIG. 9 shows a sectional view of a wheel hub and a brake flange attached to the axle assembly. The wheel hub and brake flange receive and are drivingly coupled to an axle half shaft in FIG. 9. FIG. 10 shows a sectional view of a beam of the example axle assembly. The beam of FIG. 10 may be a configuration of the first beam or the second beam of FIGS. 2-5 and FIGS. 7-9. FIG. 11 shows a method of manufacturing an axle assembly of the present disclosure, such as the axle assembly of FIGS. 2-5 and FIGS. 7-9. The schematic of the shaft of FIGS. 7-10 may be schematic configurations of the first and second shaft of FIGS. 4-5.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 shows a schematic of an example configuration with relative positioning of the various components. FIGS. 2-10 show example configurations with approximate positioning. FIGS. 2-10 are shown approximately to scale;

though other relative dimensions may be used. As used herein, the terms "approximately" is construed to mean plus or minus five percent of the range unless otherwise specified.

Further, FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may be circumferentially around or extend in a radially outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. Examples of vehicle 100 where the prime mover 106 is an ICE, the vehicle 100 may be a hybrid vehicle, where an electric machine 120 may electrify the vehicle. The transmission 108 may be any type of transmission, such as a manual transmission, an automatic transmission, or a continuously variable transmission. Additionally, the transmission 108 may include a gearbox. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 and/or electric machine 120 may be powered via energy from an energy storage device 105. In one example, the energy storage device 105 is a battery, such as a traction battery, configured to store electrical energy. An inverter 107 may be arranged between and electrically couple the energy storage device 105 and the prime mover 106 and configured to adjust direct current (DC) to alternating current (AC). Likewise, the inverter 107 may be arranged between and electrically couple the energy storage device 105 and electric machine 120 and configured to adjust DC to AC. The inverter 107 may include a variety of components and circuitry with thermal demands that effect an efficiency of the inverter 107.

The vehicle 100 may be a commercial vehicle, light, medium, or heavy duty vehicle, a passenger vehicle, an off-highway vehicle, a commercial vehicle, agricultural vehicle, and/or sport utility vehicle. For an example embodiment, the vehicle 100 may be a wheeled vehicle, such as an automobile. However, additionally or alternatively, the vehicle 100 may be plane, a boat, or other vehicle system that utilizes lubricant. Additionally or alternatively, the vehicle 100 and/or one or more of its components, such as components of the powertrain 101 and/or drivetrain 103, may be used in industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 may be an electric machine. In one example, the prime mover 106 may be an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104. The second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to vehicle 100, as part of the rotary power transferred via the second driveshaft 122. The first differential 116 and the second differential 126 may supply a FWD and RWD, respectively, as part of an AWD mode for vehicle 100.

The transmission 108 and transfer case 110 may be housed via a common housing assembly 124. The transmission 108 and the transfer case 110, may be mounted to an axle assembly, such as the first or second axle assemblies 102, 112. The transmission 108 and transfer case 110 may share a common housing with a differential. Additionally or alternatively, the transmission 108 and transfer case 110 may be mounted to a differential via the common housing or specific housings. The first differential 116 may be housed in a first common housing, where the first common housing houses a transmission and transfer case, such as the transmission 108 and the transfer case 110. Alternatively, a housing for the first differential 116 may physically couple to a second common housing, where the second common housing houses a transmission and transfer case, such as the transmission 108 and the transfer case 110. The second differential 126 may be housed in a third common housing, where the third common housing houses a transmission and transfer case, such as the transmission 108 and the transfer case 110. Alternatively, a housing for the second differential 126 may physically couple to a fourth common housing, where the fourth common housing houses a transmission and transfer case, such as the transmission 108 and the transfer case 110.

The first axle assembly 102 may include a first drivehead 136. For a first example, the common housing assembly 124 may include the first drivehead 136. The first drivehead 136 may drive couple the first differential 116 via a rotational element 146, such as a shaft. Alternatively, for another example, the first differential 116 may include or physically couple to the first drivehead 136, where the first drivehead 136 may be housed by the housing of the first differential 116. For these examples, the electric machine 120 may drive couple and electrify the first axle assembly 102 via the first drivehead 136. The first drivehead 136 may include a gearbox or another type of transmission. Additionally or alternatively, the first drivehead 136 may drive couple the transmission 108. The electric machine 120 may drive couple the first drivehead 136 via a first input 142. The electric machine 120 may physically couple to the first drivehead 136.

Additionally, for these or another example, the second axle assembly 112 may include a second drivehead 138. The second differential 126 may include or physically couple to the second drivehead 138, where the second drivehead 138 may be housed by the housing of the second differential 126. The electric machine 120 may drive couple and electrify the second axle assembly 112 via the second drivehead 138. The second drivehead 138 may include a gearbox or another type of transmission. The electric machine 120 may drive couple the second drivehead 138 via a second input 144. The electric machine 120 may physically couple to the second drivehead 138.

For example, the transmission 108 and the transfer case 110 may be mounted to the first axle assembly 102 via the common housing assembly 124. The common housing assembly 124 may house all or a portion of the first driveshaft 113. For this example, the common housing assembly 124 may house the first differential 116. For other examples, the common housing assembly 124 may be mounted to a housing for the first differential 116.

However, it is to be appreciated that a common housing or housing assembly for the transmission 108 and transfer case 110 may physically couple or be mounted to other assemblies besides the first axle assembly 102. Likewise, a common housing or housing assembly may house or be mounted to another differential besides the first differential 116. For example, if the transmission 108 and transfer case 110 may be rear mounted, the transmission 108 and transfer case 110 may be mounted to the second axle assembly 112 via a common housing assembly, such as the common housing assembly 124. For this example, the common housing assembly 124 may house the second differential 126. For other examples, the common housing assembly 124 may be mounted to a housing of the second differential 126.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover of the vehicle 100 to measure mover speed and mover temperature, a pedal position sensor to detect a depression of an operator-actuated pedal, such as an accelerator pedal or a brake pedal, a lever position sensor to detect a shifting of a lever, such as a brake lever, speed sensors at the first and second set of wheels 104, 114, etc. Upon receiving the signals from the various sensors 158 of FIG. 1, controller 156 processes the received signals, and employs various actuators 160 of vehicle 100 to adjust drivetrain operations based on the received signals and instructions stored on the memory of controller 156. For example, controller 156 may receive an indication of depression of the brake pedal, signaling a desire for decreased vehicle speed. Vehicle braking may be directly proportional to accelerator pedal position, for example, degree of depression. For another example, controller 156 may receive an indication of depression of the accelerator pedal, signaling a desire for increased vehicle speed. Vehicle acceleration may be directly proportional to accelerator pedal position, for example, degree of depression. In response, the controller 156 may command operations, such as shifting gear modes of the transmission 108. Alternatively, the gear modes of the transmission 108 may be shifted manually, such as if the transmission 108 is a manual transmission.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, and the vehicle 100 may have a second transmission arranged on the second set of axle shafts 128. The transmission 108 may be a gearbox. Alternatively, the transmission 108 may be an axle transmission or a trans axle transmission.

A set of reference axes 201 are provided for comparison between views shown in FIGS. 2-10. The reference axes 201 indicate a y-axis, an x-axis, and a z-axis. The y-axis may be and be referred to as longitudinal or horizontal. The x-axis may be and be referred to as lateral. The the z-axis may be and may be referred to as vertical. In one example, the z-axis may be parallel with a direction of gravity, and the x-y plane may be parallel with a horizontal plane that an axle assembly 202 of FIG. 2 may rest upon. In another example, the x-y plane may be parallel with a horizontal plane that a differential assembly 226 of FIG. 2 may rest upon. In another example, the x-y plane may be parallel with a horizontal plane that a beam 1022 of FIG. 10 may rest upon. When referencing direction, positive may refer to in the direction of the arrow of the y-axis, x-axis, and z-axis and negative may refer to in the opposite direction of the arrow of the y-axis, x-axis, and z-axis. A circle may represent an axis of the reference axes 201 that is normal to a view. A circle may represent an axis of the reference axes 201 that is normal to a view. A filled circle may represent an arrow and axis facing toward, or positive to, a view. An unfilled circle may represent an arrow and an axis facing away, or negative to, a view.

Turning to FIG. 2, a first view 200 of the axle assembly 202 is shown. The first view 200 may be a side view. The axle assembly 202 may have a first side 204 and a second side 206, where the first side 204 is opposite the second side 206. Likewise, the axle assembly 202 may have a third side 208 and a fourth side 210, where the third side 208 and the fourth side 210 are opposite to one another. An exterior 209 surrounds the axle assembly 202.

The axle assembly 202 may be positioned about a first axis 212, a second axis 214, and a third axis 216, such that components may be centered about each of the axes. The first and second axes 212, 214 may be longitudinal axes for the axle assembly 202 and may be parallel with the y-axis. The third axis 216 may be a lateral axis and may be parallel with the x-axis. While longitudinal axes relative to the axle assembly 202, the first and second axes 212, 214 and may be parallel with a lateral axis of a vehicle, such as the vehicle 100 of FIG. 1. Likewise, while a lateral axis relative to the axle assembly 202, the third axis 216 may be parallel with a longitudinal axis of a vehicle, such as the vehicle 100. In addition to axes, the axle assembly 202 may be sectioned by a first line 220, line A-A. A plane may be taken on the first line, where the plane is parallel with a plane formed by the y-axis and z-axis. The axle assembly 202 may be an axle system that supports a pair of axle half shafts, receive torque via a differential component, and output torque to a set of wheels that may drive couple to the axle assembly 202. For an example the axle assembly 202 may be the first axle assembly 102 or second axle assembly 112 of FIG. 1.

The axle assembly 202 may include a first section 222, a second section 224, and the differential assembly 226. The differential assembly 226 is sandwiched between the first section 222 and second section 224. The differential assembly 226 may be or include the first differential 116 or the second differential 126 of FIG. 1. The first section 222 and second section 224 may couple to the differential assembly 226. The first section 222 is positioned nearest to the first side 204 from the third axis 216 and includes the first side 204. The second section 224 is positioned nearest to the second side 206 from the third axis 216. The differential assembly 226 may be positioned about the third axis 216. The differential assembly 226 may be fluidly sealed, preventing fluid housed via the differential assembly from exiting, such as via leaking or flowing.

The differential assembly 226 may include a first housing 228 and a cover 230. The first housing 228 includes a portion of the third side 208, and the cover 230 includes a portion of the fourth side 210. The cover 230 and the differential assembly and the first housing 228 may be centrally located with respect to the axle assembly 202, where the cover 230 and the first housing 228 may be between the first section 222 and the second section 224. The cover 230 may therein be a centrally located cover (e.g., a central cover) for the axle assembly 202. Likewise, the first housing 228 may be a centrally located housing (e.g., a central housing) for the axle assembly 202. The cover 230 may be a plate, and therein a centrally located plate for the differential assembly 226 and the axle assembly 202. The first housing 228 and the cover 230 may physically couple. The first housing 228 and the cover 230 and may physically couple via fastening. For an example, the first housing 228 may have a flange 229. The flange 229 may have surface sharing contact with the cover 230, and the flange 229 may be fastened to the cover via a plurality of first fasteners 231. The first fasteners 231 may be fit to a first set complementary passages of the cover 230 and a second set of complementary passage of the flange 229. When fit through the first set of passages and the second set of passages, the first fasteners 231 may fasten the flange 229 to the cover 230. The first set of passages and the second set of passages may be holes. The first fasteners 231 may be bolts. The first set of passages and second set of passages may have a first set of fastening features that may be complementary to and mesh with a set of fastening features of the first fasteners 231. The first and second fastening features of the passages and first fasteners 231 may be threading.

The differential assembly 226 may include a differential gearset, where the differential gearset may be housed by the first housing 228 and the cover 230, such as to be enclosed by the first housing 228 and the cover 230. Likewise, the differential assembly 226 may include a transmission, such as a gearbox, that may receive torque from a rotational element outside of the axle assembly 202 and output torque to the differential gearset of the differential assembly 226. The transmission/gearbox may include the first housing 228 as a feature, where the first housing 228 may house the gears, shafts, and other rotational elements of the transmission/gearbox. The transmission/gearbox may include a drivehead 240.

The axle assembly 202 may be part of a driveline assembly, such as the drivetrain 103. The driveline assembly includes sources of power that may be transmitted to the axle assembly via rotational elements. A rotational element external to the axle assembly 202 may drive couple and output torque to the differential assembly via the drivehead 240. For an example, the rotational element may be an output from an electric machine, such as an electric motor, an electric generator, or an electric motor/generator. When drive coupled to the drivehead 240, the electric machine may electrify the axle assembly 202. The electric machine may be the electric machine 120 of FIG. 1.

The first section 222 includes a first beam 232, a first half shaft 236, a first hub 242, and a first flange 244. The second section 224 may include a second beam 234, a second half shaft 238, a second hub 252, and a second flange 254. The first beam 232 and second beam 234 may physically couple to the cover 230, such as via joining, such as via welding. Likewise, the first beam 232 and the second beam 234 may be I-beams, where the first beam 232 may be a first I-beam and the second beam 234 may be a second I-beam. However, it is to be appreciated that for another example, the first beam 232 or the second beam 234 may be another type of pre-manufactured beam, such as a C-beam. The first half shaft 236 is a first shaft for the axle assembly 202. The second half shaft 238 is a second shaft for the axle assembly 202. The first half shaft 236 and the second half shaft 238 may be the axle half shafts of the axle assembly 202. The first hub 242 may physically and drive couple the first half shaft 236. The second hub 252 may physically and drive couple the second half shaft 238. The first hub 242 and second hub 252 may be wheel hubs, where each of the first and second hubs 242, 252 may physical couple and drive couple to a wheel of a set of wheels, such as a wheel of the first set of wheels 104 or the second set of wheels 114 of FIG. 1. The first hub 242 may drive couple a wheel to the first half shaft 236. The second hub 252 may drive couple a wheel to the second half shaft 238. The first half shaft 236 and the second half shaft 238 may be centered on the first axis 212, such as to be positioned approximately radially about the first axis 212.

When drive coupled to the differential assembly 226 and integrated into the at axle assembly 202, at least one of the first half shaft 236 or the second half shaft 238 may not be fully housed, such that the first half shaft 236 or the second half shaft 238 is not fully covered, having one or more sections exposed to the exterior 209. For the example of the axle assembly 202, more than one half shaft is not fully covered, where neither the first half shaft 236 nor the second half shaft 238 are fully covered by a housing or structure. The sections of the first half shaft 236 and second half shaft 238 are not fluidly sealed from the exterior 209 and may not receive lubrication. However, portions of the first half shaft 236 and the second half shaft 238 shaft may be covered and housed. The portions of the first half shaft 236 and the second half shaft 238 housed via other components of the axle assembly may be fluidly sealed and receive lubrication.

The first flange 244 and the second flange 254 may be brake flanges and wheel flanges, where the first flange 244 is a first brake flange and a first wheel flange, and the second flange 254 is a second brake flange and a second wheel flange. The first flange 244 may physically couple the first beam 232, such as via joining via a joint, such as via welding a joint to the first flange 244 and first beam 232. The first flange 244 may be positioned about the first half shaft 236, such as to be radially about the first half shaft 236. Likewise, the second flange 254 may physically couple the second beam 234, such as via joining via a joint, such as via welding the joint to the second flange 254 and the second beam 234. The first flange 244 may have a first collar 246. The first collar 246 may have a cylindrical shape or partially cylindrical shape. The first collar 246 may be positioned about the first half shaft 236, such as around the first half shaft 236, where the first half shaft 236 is concentric to the passage of the first collar 246. A first gasket 248 may physically couple the first flange 244, and may be positioned longitudinally between the first hub 242 and the first flange 244. The second flange 254 may have a second collar 256. The second collar 256 may have a cylindrical shape or partially cylindrical shape. The second collar 256 may be positioned about the second half shaft 238, such as around the second half shaft 238, where the second half shaft 238 is concentric to the passage of the second collar 256. Likewise, a second gasket 258, may physically couple the second flange 254, and may be positioned longitudinally between the second hub 252 and the second flange 254. The first half shaft 236 may be received and mechanically supported by the first flange 244. The second half shaft 238 may be received and mechanically supported by the second flange 254. The first flange 244 and the second flange 254 may be fluidly sealed from the exterior 209, such that complementary seals and the first and second half shafts 236, 238, respectively, may prevent fluid, such as lubricant, from leaving the cavities and other volumes of the first and second flanges 244, 254.

The first gasket 248 may physically couple to the first flange 244 via fastening. Likewise, the second gasket 258 may physically couple to the second flange 254 via fastening. For example, the first gasket 248 may physically couple, fluidly seal, and fasten to the first flange 244 via a plurality of second fasteners 250. For this or other examples, the second gasket 258 may physically couple, fluidly seal, and fasten to the second flange 254 via a plurality of third fasteners 260. The first gasket 248 and the first flange 244 may have a plurality of passages, such as holes, that may receive the second fasteners 250. The passages that may receive the second fasteners 250 for the first flange 244 may be included by a plurality of first fits 296. Each of the first fits 296 may be a collar about a respective passage for a fastener of the second fasteners 250. The first fits 296 may be positioned around the first flange 244. Likewise, the second gasket 258 and the second flange 254 may have a plurality of passages, such as holes that, may receive the third fasteners 260. The passages that may receive the third fasteners 260 for the first flange 244 may be included by a plurality of second fits 298. Each of the second fits 298 may be a collar about a respective passage for a fastener of the third fasteners 260. The second fits 298 may be positioned around the second flange 254. The second fasteners 250 and the third fasteners 260 may be coupled to the first fits 296 and second fits 298, respectively, via one or more of a plurality of first nuts 292 and one or more of a plurality of second nuts 294, respectively. The second and third fasteners 250, 260 may be the same type of fasteners, where the second and third fasteners 250, 260 may be approximately the same dimensions, where the second fasteners 250 and the third fasteners 260 are approximately symmetrical. The first nuts 292 and the second nuts 294 may be the same type of nuts, such that the first nuts 292 and the second nuts 294 are approximately the same dimensions and have the same fastening features.

The first hub 242 may physically couple and drive couple a wheel via fastening. Likewise, the second hub 252 may physically and drive couple a wheel via fastening. For an example, the first hub 242 may fasten to a wheel via a plurality of fourth fasteners 262. For this or another example, the second hub 252 may fasten to a wheel such as via a plurality of fifth fasteners 264. The fourth fasteners 262 and the fifth fasteners 264 may have fastening features, such as threading, complementary to fits of the respective wheels the fourth fasteners 262 and/or fifth fasteners 264 may fasten to. The fourth fasteners 262 and the fifth fasteners 264 may be screws, bolts, or another form of fastener with threading.

The first half shaft 236 may be received by the differential assembly 226 via a first tube 266 of the first housing 228. The second half shaft 238 may be received by the differential assembly 226 via a second tube 268 of the first housing 228. The first and second tubes 266, 268 may be a first and a second socket for the first housing 228 The first tube 266 and second tube 268 may each have a seal that fluidly seals the cavities of the differential assembly 226 with their respective half shafts 236, 238. The drivehead 240 may be centered about the second axis 214, such that a third flange 272, a third socket 274, and an input 276 of the drivehead 240 may be centered around second axis 214. The second axis 214 may be concentric to the third socket 274 and the input 276. The third flange 272 may be positioned about the third socket 274, such as around the third socket 274. Likewise, the third socket 274 may be positioned radially about or around the input 276. An electric machine may physically and rigidly couple to the drivehead 240, such as via the third flange 272. When physically coupled to an electric machine, the third flange 272 may physically couple and have surface sharing contact with a complementary feature, such as another flange or a surface, of the electric machine. The third flange 272 may physically couple to the complementary component the electric machine via fastening. The third flange 272 may have a plurality of holes 278. A plurality of fasteners that may fasten the third flange 272 to the electric machine may be complementary and fit to the holes 278. A plurality of platforms 280 may be positioned around the holes and share a continuous surface with the third flange 272. The platforms 280 may extend in an outward direction from the third flange 272 and in an outward direction with respect to the second axis 214. The third socket 274 may fluidly seal the drivehead 240 from the exterior 209. The input 276 may be an input to the drivehead 240 that drive couples the gear sets, shafts, and other rotational elements housed in the drivehead 240 and the first housing 228. An output from the electric machine may drive couple the input 276. Torque from the electric machine may be input to the drivehead 240, the differential gearset, and the other gearsets housed via the first housing 228 via the input 276.

The cover 230 may physically couple to the first beam 232 at a first shoulder 282. Likewise, the cover 230 may physically couple to the second beam 234 at a second shoulder 284. The cover 230 may have a first appendage 286 and a second appendage 288, where the first appendage 286 is opposite the second appendage 288. The first shoulder 282 and the second shoulder 284 may be cuts, such as cutouts, of the first beam 232 and second beam 234, respectively. For example, the first shoulder 282 may be or be created from a first cut of the first beam 232, and the second shoulder 284 may be or be created from a second cut of the second beam 234. As cuts, the first shoulder 282 and the second shoulder 284 may be machined from the first beam 232 and the second beam 234, respectively. The first appendage may be nearest to the first side 204 from the second side 206, and the second appendage may be nearest to the second side 206 from the first side 204. The first appendage 286 may physically couple to the first shoulder 282. The second appendage 288 may physically couple to the second shoulder 284. For an example, the first shoulder 282 and the second shoulder 284 may be prefabricated features of the first beam 232 and the second beam 234, respectively. However, for an alternate example, the first shoulder 282 and second shoulder 284 may be stamped, cut, or machined from the first beam 232 or the second beam 234, respectively.

The first beam 232 may be a first length 290 and the second beam 234 may be a second length 291, where the first length 290 and the second length 291 are parallel with the first axis 212 and the second axis 214. The first length 290 and the second length 291 may be approximately the same distance. The first length 290 and the second length 291 may be between a range of thresholds, including a lower threshold and an upper threshold. For example, the first length 290 and the second length 291 may be between distances of 20 and 24 in (inches), where 20 in is a lower threshold and 24 in is an upper threshold. However, it is to be appreciated that the first beam 232 and the second beam 234 may be made to order and may have a custom length.

Turning to FIG. 3, a second view 300 of the axle assembly 202 is shown. The second view 300 is a side view. The axle assembly 202 in the second view 300 is shown without the first half shaft 236, the second half shaft 238, the first flange 244, the second flange 254, the first hub 242, and the second hub 252 of FIG. 2.

The first tube 266 and the second tube 268 may each have an opening and passage via which the first and second half shafts 236, 238 may be received. For example, the first tube 266 may have a first opening 310. The first opening 310 may be may be orifice, such as a hole. The first opening 310 may have a circular area and shape. Likewise, the second tube 268 may have a second opening. The second opening may be symmetrical and mirrored with respect to the first opening 310.

The first beam 232 may include a first platform 312, a second platform 314, and a first web 316. The first platform 312 and second platform 314 may be located at the top and bottom, respectively, of the first beam 232. The first platform 312 and second platform 314 may be rectangular in shape, with a plurality of rectangular areas and surfaces. The first web 316 may be continuous with and connect the first platform 312 to the second platform 314. The first web 316 may have a first surface 318 that faces toward the third side 208. At least the first platform 312 includes the first shoulder 282. The first shoulder 282 may have a surface continuous with the first web 316.

The second beam 234 may include a third platform 322, a fourth platform 324, and a second web 326. The third platform 322 and the fourth platform 324 may be located at the top and bottom, respectively, of the second beam 234. The third platform 322 and the fourth platform 324 may be rectangular in shape, with a plurality of rectangular areas and surfaces. The second web 326 may be continuous with and connect the third platform 322 and the fourth platform 324. The second web 326 may have a second surface 328 that faces toward the third side 208. At least the third platform 322 includes the second shoulder 284. The second shoulder 284 may have a surface continuous with the second web 326.

The first platform 312, second platform 314, and first web 316 may be approximately symmetrical to the third platform 322, fourth platform 324, and second web 326, respectively.

The first flange 244 may physically couple to the first beam 232 via a first joint 332. A portion of the first joint 332 may physically couple and curve around the first flange 244, such as to curve around a first portion of the first flange 244. A portion of the first joint 332 may extend away from the first flange 244 and physically couple to the first beam 232. The first joint 332 may physically couple a portion of the first platform 312, a portion of the second platform 314, and a portion the first web 316. The first joint 332 may physically couple to the first surface 318 to physically couple the first web 316. The first joint 332 may join to the first platform 312, the second platform 314, and the first web 316 to physically couple the first beam 232. The first joint 332 may join to first flange 244 to physically couple. The first joint 332 may be joined to features of the first beam 232 and features of the first flange 244 via joining techniques, such as via a weld, a plurality of welds, or other welding techniques.

The second flange 254 may physically couple to the second beam 234 via a second joint 334. A portion of the second joint 334 may physically couple and curve partially around the second flange 254, such as to curve around a second portion of the second flange 254. A portion of the second joint 334 may extend away from the second flange 254 and physically couple to the second beam 234. The second joint 334 may physically couple a portion of the third platform 322, a portion of the fourth platform 324, and a portion the second web 326. The second joint 334 may physically couple to the first surface 318 to physically couple the second web 326. The second joint 334 may join to the third platform 322, the fourth platform 324, and the second web 326 to physically couple the second beam 234. The second joint 334 may join to second flange 254 to physically couple. The second joint 334 may be joined to features of the second beam 234 and features of the second flange 254 via joining techniques, such as via a weld, a plurality of welds, or other welding techniques.

The first flange 244 may include a first socket 342 and a second socket 344. The first socket 342 and the second socket 344 may receive the first half shaft 236 of FIG. 2. Likewise, the first half shaft 236 may be concentric to the first socket 342 and the second socket 344, such as when received by the first flange 244. The second flange 254 may include a third socket and a fourth socket 348. The third socket and the fourth socket 348 may receive the second half shaft 238 of FIG. 2. Likewise, the second half shaft 238 may be concentric to the third socket and the fourth socket 348, such as when received by the second flange 254. The first socket 342 and the second socket 344 may be approximately symmetrical and mirrored with the third socket and the fourth socket 348, respectively.

The first flange 244 may have a plurality of passages complementary and fit to the second fasteners 250 of FIG. 2. For an example, the plurality of the aforementioned passages include a plurality of second holes 352. The first fits 296 may include the plurality of second holes 352, where each of the first fits 296 may have at least a hole of the second holes 352. Likewise, the second flange 254 may have a plurality of additional passages complementary and fit to the third fasteners 260 of FIG. 2. For an example, the additional passages may be a plurality of third holes. The second fits 298 may include the plurality of third holes, where each of the second fits 298 may include a hole of the third holes. The third holes may be symmetrical to and mirror second holes 352.

Turning to FIG. 4, a third view 400 of the axle assembly 202 is shown. The third view 400 is a side view. The axle assembly 202 in the third view 400 is shown without the first housing 228, the drivehead 240, or the gearsets housed via the first housing 228.

The cover 230 may include a shell section 422 and a flange section 424. The shell section 422 depresses toward the fourth side 210. The shell section 422 and flange section 424 are around and form a first cavity 426. The third view 400 shows the cover 230 has a surface 420 that is continuous and level on the same plane across features of the cover 230, such as the first appendage 286 and the second appendage 288. The surface 420 is also continuous with and across the flange section 424 of the cover 230. The surface 420 may be a common surface connecting the first appendage 286, second appendage 288, and the flange section 424. The surface 420 may be parallel and level with a plane formed by the x-axis and z-axis of the reference axes 201. The flange section 424 may extend around and in an outward direction from an opening 428, where an outward direction may be relative to and away from the third axis 216. The opening 428 is an opening to the first cavity 426, and therein the first cavity 426 and the opening 428 may share a continuous and connected volume. The opening 428 may be octagonal in shape, with rounded corners. Around the first cavity 426, the shell section 422 has smooth surfaces with curved edges. A portion of the shell section 422 may create a rounded perimeter, such as an elliptical perimeter, around a portion of the first cavity 426. The flange section 424 may make surface sharing contact with and physically couple to the flange 229 of the first housing 228 of FIG. 2., such as for example via fastening via the first fasteners 231. The first cavity 426 may house a gearset or a portion of a gearset, such as a differential gearset. One or more of a plurality of third joints 432 and one or more of a plurality of fourth joints 434 may physically couple to the surface 420.

At least one of the third joints 432 may physically couple to the first appendage 286 via the surface 420. The at least one of the third joints 432 may physically couple to the first beam 232 via a surface of the first shoulder 282. The first beam 232 and the first appendage 286 may be physically coupled via at least one of the third joints 432. Each of the third joints 432 may physically couple the first beam 232 and the first appendage 286 via joining or a joining technique, such as via a weld or a welding technique. Each of the third joints 432 may physically couple the surface 420 and at least a surface of the first shoulder 282 via joining or a joining technique, such as welding. It is to be appreciated, there may be a plurality of third joints 432, and that each of the third joints 432 may physically couple to multiple surfaces of the first shoulder 282.

At least one of the fourth joints 434 may physically couple to the second appendage 288 via the surface 420. The at least one of the fourth joints 434 may physically couple to the second beam 234 via a surface of the second shoulder 284. The second beam 234 and the second appendage 288 may be physically coupled via at least one of the fourth joints 434. Each of the fourth joints 434 may physically couple the second beam 234 and the second appendage 288 via joining or a joining technique, such as via a weld or a welding technique. Each of the fourth joints 434 may physically couple the surface 420 and at least a surface of the second shoulder 284 via joining or a joining technique, such as welding. It is to be appreciated, there may be a plurality of fourth joints 434, and that each of the fourth joints 434 may physically couple to multiple surfaces of the second shoulder 284.

The third view 400 shows a first input 442 of the first half shaft 236 and a second input 444 of the second half shaft 238. The first input 442 may drive couple and receive torque from a gearset housed by the differential assembly 226 of FIG. 1. Likewise, the second input 444 may drive couple and receive torque from the gearset housed by the differential assembly 226. The first input 442 and the second input 444 may have plurality of fastening features, such as splines. The fastening features of the first input 442 and the second input 444 may each mesh with a plurality of complementary fastening features, such as complementary splines, of a gear. When the fastening features of the first input 442 meshes with the complementary fastening features of a first respective complementary gear, the first input 442 may rigid couple and drive couple the respective complementary gear. Likewise, when the fastening features of the second input 444 meshes with the complementary fastening features of a second respective complementary gear, the second input 444 may rigid couple and drive couple the respective complementary gear.

The shell section 422 may include a first orifice 462 and a second orifice 464. The first orifice 462 and the second orifice 464 may be through orifices that extend through the material of the shell section 422.

Turning to FIG. 5, a fourth view 500 of the axle assembly 202 is shown. The fourth view 500 is a side view. The axle assembly 202 in the fourth view 500 is shown without the first housing 228, the drivehead 240, or the gearsets housed via the first housing 228 or the drivehead 240. In the fourth view 500 the axle assembly 202 is shown without the first half shaft 236, the second half shaft 238, the first flange 244, the second flange 254, the first hub 242, and the second hub 252 of FIG. 2. Likewise, in the fourth view 500 the axle assembly 202 is shown without the first housing 228, the drivehead 240, or the gearsets housed via the first housing 228 or the drivehead 240.

The cover 230 may have an orifice 542. The orifice 542 is a through passage, such as a through hole or a port, that extends through the cover 230. The orifice 542 may be a drain orifice such as a drain port. A plug may be, such as a drain plug, may be fit and complementary to the orifice 542, such as to fluidly seal the orifice 542 when received. The orifice 542 may be centered around the third axis 216, such that the third axis 216 is concentric to the orifice 542. The cover 230 also has a plurality of fourth holes 552, where the flange section 424 includes the fourth holes 552. The fourth holes 552 may be included by the surface 420, where the fourth holes 552 may extend normal to and into the surface 420 in the direction of the fourth side 210. The fourth holes 552 may have centerlines that are normal to the surface 420. The fourth holes 552 may have centerlines that are parallel with the third axis 216. The fourth holes 552 may be complementary to the first fasteners 231 of FIG. 2, where the first fasteners 231 may be fit to the fourth holes 552. The fourth holes 552 may have fastening features that may mesh or lock with complementary fastening features of the first fasteners 231. The fastening features of the fourth holes 552 and the first fasteners 231 may be threading, where a first threading of the first fasteners 231 may be threaded and complementary to a second threading of the of fourth holes 552.

Turning to FIG. 6, it shows a fifth view 600 of the differential assembly 226. The fifth view 600 is a side view. The fifth view 600 shows the differential assembly 226 separate and decoupled from other features and components of the axle assembly 202 of FIG. 2.

The first housing 228 may include a first support 612, a second support 614, and a second shell 616. The first support 612 and the second support 614 may be ribs. The first support 612 and the second support 614 extend around the second shell 616. The first support 612 may curve upward from the drivehead 240 toward the flange 229. The first support 612 may extend and curve upward in a direction parallel with the third axis 216. The second support 614 may curve upward from the first tube 266 toward the first support 612. Likewise, the second support 614 may also curve upward from the second tube 268 toward the first support 612. The second support may extend upward in a direction of and/or parallel with the first axis. The first support 612 may extend laterally with respect to the differential assembly 226 and the third axis 216. Likewise, the second support 614 may extend longitudinally with respect to the differential assembly 226 and the first axis 212. The second shell 616 may wrap around a volume. The volume wrapped by the second shell 616 may house rotational elements of the differential assembly 226, such as gear sets and shafts of a gearbox, gear sets and shafts drive coupled and part of the drivehead 240, and a differential gearset. The second shell 616 may house portions of axle half shafts received via the first and second tubes 266, 268, such as portions of the first half shaft 236 and second half shaft 238 of FIG. 2. The first and second supports 612, 614 may also include and be positioned about volumes to house rotational elements of the differential assembly 226, such as gears and gearsets.

The first housing 228 may include a first mounting component 622. The third flange 272 may couple physically couple to the first mounting component 622. For example, the third flange 272 may have a second mounting component 628. The third flange 272 may physically couple or include and be connected to the second mounting component 628. The second mounting component 628 may physically couple to the first mounting component 622. The second mounting component 628 may have surface sharing contact with the first mounting component 622. The second mounting component 628 and the third flange 272 may physically couple the first housing 228 via physically coupling to the first mounting component 622. The second mounting component and third flange 272 may physically couple the first housing via fastening, such as by fastening via a plurality of fasteners. The plurality of fasteners for fastening second mounting component 628 and third flange 272 to the first housing 228 may include a plurality of sixth fasteners 624 and a plurality of seventh fasteners 626. The sixth fasteners 624 may be complementary to a plurality third fits, such as passages, such as holes. The third fits are features included by the first mounting component 622. The sixth fasteners 624 are complementary to the third fits. The sixth fasteners 624 may be received by and fasten to the first mounting component 622 via the third fits. Each of the sixth fasteners 624 may be passed through a complementary through a passage of the second mounting component 628 and received by the third fits, such as to fasten the second mounting component 628 to the first mounting component 622. The seventh fasteners 626 may be complementary to a plurality of fourth fits 630. The fourth fits 630 are features included by the first housing 228. The seventh fasteners 626 are complementary to the third fits, such as to be received by and fasten to the first mounting component 622 via the fourth fits 630. The fourth fits 630 may be at a surface opposite the first mounting component 622.

The drivehead 240 may have an opening 632. The opening 632 may receive the input 276. The opening 632 may be an open ended passage or set of passages that extends through the third socket 274, the first housing 228, and the drivehead 240. The opening 632 may receive the input 276. The drivehead 240 may include a valley 634. The valley 634 may be a concave surface (e.g., a surface with a concave profile) extending from the third flange 272 to the third socket 274. The valley 634 may be arranged axially between the third flange 272 and the third socket 274, with respect to the second axis 214. The valley 634 is may extend in a radial direction outward from the third socket 274 toward the third flange 272, with respect to the second axis 214. The third socket 274 may be arranged axially between the valley 634 and the opening 632. The third socket 274 may include a surface 642. The surface 642 may have a concave profile extending from the valley 634 to the opening 632. The surface 642 is may extend in a radial direction outward from the opening 632 toward the valley 634, with respect to the second axis 214.

The input 276 may have one or more of a plurality of fastening features allowing for coupling with another rotational element with complementary fastening features, such as an output from an electric machine. For example, the input 276 may be splined such as to have a plurality of splines 662. The splines 662 may mesh with complementary splines of a rotational element, such as the output of the electric machine.

Turning to FIG. 7, a sixth view 700 of the differential assembly 226 is shown. The sixth view 700 is a side view. The sixth view 700 is also a sectional view, showing the differential assembly 226 sectioned via a sectional plane. The section and sectional plane of the sixth view 700 may be taken on the first line 220 of FIG. 2. The respective sectional plane of the sixth view 700 that is taken on the first line 220 is parallel with a plane formed by the y-axis and z-axis of the reference axes 201. The respective sectional plane of the sixth view 700 is normal to the x-axis of the reference axes 201.

The sixth view 700 shows that the second tube 268 may have a second opening 710. The second opening 710 may have at least the same diameter as the first opening 310, and the second opening 710 may receive half shafts sharing the same dimensions, such as diameter, as half shafts received via the first opening 310. The second opening 710 may be approximately symmetrical to and mirror the first opening 310. Likewise, the first area 706 and a second area 708. The first area 706 may be represented as a plurality of dashed lines arranged in a rectangle. The first area 706 may enclose the differential assembly 226 and portions of the first half shaft 236, the second half shaft 238, the first beam 232, and the second beam 234. The second area 708 may be represented as a plurality of dashed lines arranged in a rectangle. The second area 708 may enclose the first hub 242 and the first flange 244, and portions of the first half shaft 236 and the first beam 232.

The sixth view 700 shows the first housing 228 includes a second cavity 722. The first cavity 426 and the second cavity 722 may house a differential gearset 720, where the first cavity 426 and the second cavity 722 create a chamber to house the differential gearset 720. The chamber of the first cavity 426 and the second cavity 722 may be created and enclosed by the second shell 616 and the cover 230, such as when the first housing and 228 and cover 230 physically couple. The differential gearset 720 may drive couple and output torque to the first half shaft 236 and the second half shaft 238.

The differential gearset 720 includes a first carrier 724 and a second carrier 726. The first carrier 724 and the second carrier 726 may both support a differential case 728. The differential gearset 720 may include a ring gear 730, a first side gear 732, and a second side gear 734. The ring gear 730 may be positioned between the first side gear 732 and the second side gear 734. The ring gear 730 may be a crown gear and crown wheel for the differential gearset 720. The ring gear 730 may be positioned around at least a portion of the differential case 728, such as radially about a portion of the differential case 728. The ring gear 730 may be supported by the differential case 728, such as when and positioned radially about the differential case 728. The first carrier 724 and the differential case 728 may support the first side gear 732. Likewise, the second carrier 726 and the differential case 728 may support the second side gear 734. The first side gear 732 and the second side gear 734 may rotate freely of the differential case 728, such as when supported via respective complementary carriers and the differential case 728. The first carrier 724 may be positioned around the first half shaft 236, such as radially around the first half shaft 236. A portion of the differential case 728 may be sandwiched between the first carrier 724 and the first half shaft 236. The first side gear 732 may rotationally couple to the first half shaft 236, such that the first half shaft 236 and the first side gear 732 may rigidly couple and rotate and/or be driven by an input of torque in the same direction. The first side gear 732 may couple the first half shaft 236 such as via meshing or fastening with the first input 442. The first side gear 732 may be positioned about the first half shaft 236, such as around the first half shaft 236, such as radially around the first half shaft 236. A portion of the first side gear 732 may be radially between a portion of the differential case 728 and the first half shaft 236. The second carrier 726 may be positioned around the second half shaft 238, such as radially around the second half shaft 238. A portion of the differential case 728 may be sandwiched between the second carrier 726 and the second half shaft 238. The second side gear 734 may rotationally couple to the second half shaft 238, such that the second half shaft 238 and the second side gear 734 may rigidly couple and rotate and/or be driven by an input of torque in the same direction. The second side gear 734 may couple the second half shaft 238 such as via meshing or fastening with the second input 444. The second side gear 734 may be positioned about the second half shaft 238, such as around the second half shaft 238, such as radially around the second half shaft 238. A portion of the second side gear 734 may be radially between a portion of the differential case 728 and the second half shaft 238.

The first housing 228 may house a first differential seal 736 and a second differential seal 738. The first tube 266 may house the first differential seal 736, and the second tube 268 may house the second differential seal 738. The first differential seal 736 may be fit to the first opening 310, such as to seal against and physically couple the first opening 310. The first differential seal 736 may be positioned about and receive the first half shaft 236. The second differential seal 738 may be fit to the second opening 710, such as to seal against and physically couple the second opening 710. The second differential seal 738 may be positioned about and receive the second half shaft 238. The first differential seal 736 and the second differential seal 738 may be the same type of seal, where the first differential seal 736 and second differential seal 738 may be of the same configuration and share the same dimensions. The first differential seal 736 and the second differential seal 738 may be mirrored when housed by the first housing 228. For example, the first differential seal 736 when housed via the first tube 266 may mirror the second differential seal 738 when house via the second tube 268. The first housing 228 may be fluidly sealed via the first differential seal 736 and the second differential seal 738, such that fluid housed via the first housing 228 and the cover 230, may not exit to the exterior 209.

The first differential seal 736 may contact an inner surface of the first tube 266, where the inner surface may be a surface of the first opening 310. The first differential seal 736 may receive the first half shaft 236, such as via a through opening. The first differential seal 736 may be sandwiched radially between the first opening 310 and the first half shaft 236. The first differential seal 736 may form seal against the inner surface of the first tube 266, such as a surface of the first opening 310. Likewise, the first differential seal 736 may form a seal against the first half shaft 236, such as when positioned radially about the first half shaft 236. The seal with the first tube 266 and seal with the first half shaft 236 provided by the first differential seal 736 may be fluid tight, such that fluid, such as lubricant, housed in the second cavity 722 may not pass the first differential seal 736. The first half shaft 236 may rotate/spin freely of the first differential seal 736, such as when the first differential seal 736 is radially about, in surface sharing contact, and fluidly sealed against the first half shaft 236.

The second differential seal 738 may contact an inner surface of the second tube 268, where the inner surface may be a surface of the second opening 710. The second differential seal 738 may receive the second half shaft 238, such as via a through opening. The second differential seal 738 may be sandwiched radially between the second opening 710 and the second half shaft 238. The second differential seal 738 may form seal against the inner surface of the second tube 268 such as a surface of the first opening 310. Likewise, the second differential seal 738 may form a seal against the second half shaft 238, such as when positioned radially about the second half shaft 238. The seal with the second tube 268 and seal with the second half shaft 238 provided by the first differential seal 736 may be fluid tight, such that fluid, such as lubricant, housed in the second cavity 722 may not pass the second differential seal 738. The second half shaft 238 may rotate/spin freely of the second differential seal 738, such as when the second differential seal 738 is radially about, in surface sharing contact, and fluidly sealed against the second half shaft 238.

The first hub 242 may have a first opening 740 and that the second hub 252 has a second opening 742. The first opening 740 and the second opening 742 may be conical in shape. Likewise, the first opening 740 may be approximately symmetrical to and mirror the second opening 742. The sixth view 700 also shows a plurality of internal components housed by first flange 244 and the second flange 254. For example, the first flange 244 may house a first bearing 744 and a first retainer ring 746. Likewise, the second flange 254 may house a second bearing 754 and a second retainer ring 756. The sixth view 700, also shows the second flange 254 has a third socket 752. The third socket 752 may be the third socket described above in FIG. 3 in relation to the fourth socket 348 and the second flange 254. The third socket 752 may be symmetrical and mirrored with respect to the first socket 342. The first bearing 744 may be symmetrical and mirrored with the second bearing 754. The first retainer ring 746 may be symmetrical and mirrored with the second retainer ring 756. The first flange 244 and the second flange 254 may be fluidly sealed, such that fluid, such as lubricant, housed via the first flange 244 or the second flange 254 may not exit to the exterior 209. The first flange 244 may be fluidly sealed via a plurality of first fluid seals. The second flange 254 may be fluidly sealed via a plurality of second fluid seals.

The first socket 342 may house the first bearing 744. The first socket 342 and first gasket 248 may enclose the first bearing 744. The first socket 342 may house the first retainer ring 746. The first retainer ring 746 may be sandwiched between the first bearing 744 and the second socket 344. The first bearing 744 and the first retainer ring 746 may be positioned about, such as around, such as radially about, the first half shaft 236. The first bearing 744 and the first retainer ring 746 may support the first half shaft 236, such that the first half shaft 236 may rotate or spin freely, such as about the first axis 212. The first retainer ring 746 may prevent the first half shaft 236 from shifting or sliding in a direction coaxial to or parallel with the first axis 212. Fluid housed by portions of the first flange 244, such as fluid housed via the first socket 342, may coat or immerse components housed via the first socket 342, including the first bearing 744, the first retainer ring 746, and a portion of the first half shaft 236. Fluid may be prevented from exiting the first socket 342 via the first fluid seals. The fluid may be a lubricant and may lubricate the first bearing 744, the first retainer ring 746, and the portion of the first half shaft 236

The third socket 752 may house the second bearing 754. The third socket 752 and the second gasket 258 may enclose the second bearing 754. The third socket 752 may house the second retainer ring 756. The second retainer ring 756 may be sandwiched between the second bearing 754 and the fourth socket 348. The second bearing 754 and the second retainer ring 756 may be positioned about, such as around, such as radially about, the second half shaft 238. The second bearing 754 and the second retainer ring 756 may support the second half shaft 238, such that the second half shaft 238 may rotate or spin freely, such as about the first axis 212. The second retainer ring 756 may prevent the second half shaft 238 from shifting or sliding in a direction coaxial to or parallel with the first axis 212. Fluid housed by portions of the second flange 254, such as fluid housed via the third socket 752, may coat or immerse components housed via the third socket 752, including the second bearing 754, the second retainer ring 756, and a portion of the second half shaft 238. Fluid may be prevented from exiting the third socket 752 via the second fluid seals. The fluid may be a lubricant and may lubricate the second bearing 754, the second retainer ring 756, and the portion of the second half shaft 238.

Turning to FIG. 8, a seventh view 800 of the differential assembly 226 is shown. The seventh view 800 is a sectional view. The seventh view 800 is taken on and shows the first area 706 of FIG. 7, where components and features enclosed by the first area 706 are separated from other components and features of axle.

The seventh view 800 shows that the differential assembly 226 may include a plurality of third joints 432 and fourth joints 434 of FIG. 4 that may join the first beam 232 and second beam 234, respectively, to the cover 230. The third joints 432 may include a first third joint 432*a*, a second third joint 432*b*, and a third third joint 432*c*. The first third joint 432*a* may join the first appendage 286 at the first shoulder 282 of FIG. 2 at the first platform 312 and the first web 316. The second third joint 432*b* may join the first appendage 286 at the first shoulder 282 at the first web 316. The third third joint 432*c* may join the first appendage 286 at the first shoulder 282 at the second platform 314 and the first web 316. The first third joint 432*a* and the third third joint 432*c* may be horizontal in length, relative to the y-axis of the reference axes 201. Likewise, the first third joint first third joint 432*a* and the third third joint 432*c* may be approximately symmetrical in dimensions. The second third joint 432*b* may be vertical in length, relative to the z-axis of the reference axes 201.

The fourth joints 434 may include a first fourth joint 434*a*, a second fourth joint 434*b*, and a third fourth joint 434*c*. The first fourth joint 434*a* may join the second appendage 288 at the second shoulder 284 of FIG. 2 at the third platform 322 and the second web 326. The second fourth joint 434*b* may join the second appendage 288 at the second shoulder 284 at the second web 326. The third fourth joint 434*c* may join the second appendage 288 at the second shoulder 284 at the fourth platform 324 and the second web 326. The first fourth joint 434*a* and the third fourth joint 434*c* may be horizontal in length, where horizontal is longitudinal relative to the y-axis of the reference axes 201. Likewise, the first fourth joint 434*a* and the third fourth joint 434*c* may be approximately symmetrical in dimensions. The second fourth joint 434*b* may be vertical in length, relative to the z-axis of the reference axes 201.

The differential case 728 may rotate and be driven via the ring gear 730. The differential case 728 may be divided into a first section 822 and a second section 824. The first section 822 and the second section 824 may meet at a region 820. At region 820 there may be a gap. The first section 822 and second section 824 may rotate independently of each other and be driven at different speeds.

The first housing 228, the second cavity 722 may include a first supporting surface 826 and a second supporting surface 828. The second shell 616 of FIG. 6 may include the first supporting surface 826 and the second supporting surface 828. Likewise, portions of the second support 614 of FIG. 6 may include the first supporting surface 826 and the second supporting surface 828. The first and second supporting surfaces 826, 828 may partially curve around the first axis 212. The first supporting surface 826 and a portion of the first cavity 426 may curve around the first axis 212, such as radially about the first axis 212. Likewise, the second supporting surface 828 and a portion of the first cavity 426 may curve around the first axis 212, such as radially about the first axis 212. The first supporting surface 826 may mirror and be symmetrical to the second supporting surface 828. When the first carrier 724 is housed via the second cavity 722, the first supporting surface 826 may support the first carrier 724, such that the first carrier 724 may be fixed to and or rest upon the first supporting surface 826. Likewise, when the second carrier 726 is housed via the second cavity 722 second supporting surface 828 may support the second carrier 726, such that the second carrier 726 may be fixed to and or rest upon the second supporting surface 828.

The differential gearset 720 may include one or more of a plurality of bevel gears 832. The bevel gears 832 may be spider gears. The ring gear 730 may transfer torque to the first side gear 732 and the second side gear 734 via the bevel gears 832. The bevel gears 832 may drivingly couple the first side gear 732 and the second side gear 734, such as to distribute torque to the first side gear 732 and the second side gear 734. The bevel gears 832 may distribute different quantities of torque to the first side gear 732 and the second side gear 734, such as from the ring gear 730.

A first bearing 842 may be complementary to the first carrier 724, such that the first bearing 842 may be fit to the first carrier 724. The first carrier 724 may have a first passage 846. Likewise, a second bearing 844 may be complementary to the second carrier 726, such that the second bearing 844 may be fit to the second carrier 726. The second carrier 726 may have a second passage 848. The first bearing 842 and the second bearing 844 may be roller bearings. The first bearing 842 may be radially between the first carrier 724 and the first section 822. The second bearing 844 may be radially between the second carrier 726 and the second section 824. The first and second passages 846, 848 may be variable including a plurality of diameters. For example, first passage 846 may have a first diameter and a second diameter, where the second diameter is larger than the first diameter. The first bearing 842 may be fit to the second diameter. Likewise, for this or another example, the second passage 848 may have a first diameter and a second diameter, where the second diameter is larger than the first diameter. The second bearing 844 may be fit to the second diameter. The first half shaft 236 may be received by and passed through the first passage 846. The first section 822 may receive the first half shaft 236. Likewise, the second half shaft 238 may be received by and passed through the second passage 848. The second section 824 may receive the second half shaft 238. Alternatively, there may be more than one bearing per carrier, such that there is a plurality of first bearings and/or a plurality of second bearings specific to the first carrier 724 and the second carrier 726, respectively.

The first bearing 842 may support the first carrier 724 and the first section 822, such that the first section 822 may rotate freely from the first carrier 724. The first section 822 may rigidly couple the first side gear 732 and/or the first half shaft 236, such as to be driven with the first side gear 732 and/or the first half shaft 236. The second bearing 844 may support the second carrier 726 and the first section 822, such that the second section 824 may rotate freely from the first carrier 724. The second section 824 may rigidly couple the second side gear 734 and/or the second half shaft 238, such as to be driven with the second side gear 734 and/or the second half shaft 238.

The ring gear 730 may drive couple and rotationally couple the differential case 728, such that differential case 728 may be rotated and driven via the ring gear 730. The ring gear 730 may physically couple to the second section 824. For an example, a plurality of fasteners 852 may fasten the ring gear 730 to the second section 824.

Turning to FIG. 9, an eighth view 900 of the differential assembly 226 is shown. The eighth view 900 is a sectional view. The eighth view 900 is taken on and shows the second area 708 of FIG. 7, where components and features enclosed by the second area 708 are separated from other components and features of the axle assembly 202.

The eighth view 900 shows an outboard direction 912 and an inboard direction 914. The outboard direction 912 and the inboard direction 914 are parallel with the first axis 212 and are opposite to one another. The outboard direction 912 may be in the direction of the first side 204 and the inboard direction 914 may be in the direction of the differential assembly 226 of FIG. 2.

The first flange 244 may house a first seal 932, a second seal 934, and a third seal 936. The first seals of the first flange 244 may include the first seal 932, the second seal 934, and the third seal 936. The first seal 932 is an outboard seal, positioned in the outboard direction 912 of components housed by the first flange 244 to be lubricated, such as the first bearing 744. The second seal 934 is a first inboard seal, positioned in the inboard direction 914 of the components housed by the first flange 244 to be lubricated. Likewise, the third seal 936 is a second inboard seal, the components housed by the first flange 244 to be lubricated. The first seal 932 and the second seal 934 may fluidly seal a fluid, such as lubricant, in the first socket 342. The first seal 932 may be fit to and couple the first gasket 248. The first seal 932 may be sandwiched between the first gasket 248 and the first bearing 744. The second seal 934 may be positioned radially between the first flange 244 and the first retainer ring 746. The second seal 934 may be positioned radially between a surface of the first socket 342 and the first retainer ring 746. The third seal 936 may be positioned radially between the first retainer ring 746 and the first half shaft 236.

The first bearing 744 may include a band 942 and a race 944. The band 942 have surface sharing contact with the first flange 244. The band 942 may have surface sharing contact with the inner surface of the first socket 342. The race 944 may be positioned radially around the first half shaft 236. The race 944 may have surface sharing contact with the first half shaft 236.

The first half shaft 236 may have a first land 946, a second land 948, and a third land 949 that extend radially from the first half shaft 236. The first land 946, second land 948, and third land 949 may be positioned in the outboard direction 912 of the first beam 232. The second land 948 may be positioned in the outboard direction 912 of the first land 946. The third land 949 may be positioned in the outboard direction of the second land 948. The first hub 242 may be positioned in the outboard direction 912 of the third land 949. The third land 949 may have a surface be continuous with or meet with a curvature 950. The curvature 950 curvature is convex in shape and gradually expands in a radial direction to the perimeter of the first hub 242. The third land 949 has a greater diameter than the second land 948. The second land 948 may have a greater diameter than the first land 946.

The first socket 342 may have a plurality of steps that may descend radially toward the first axis 212. The first socket 342 may have a first step 952, a second step 954, and a third step 956. The first step 952 may be in the inboard direction 914 of the first gasket 248. The second step 954 may be in the inboard direction 914 of the first step 952. The third step may 956 may be in the inboard direction 914 of the second step 954. The first step 952 may have a first diameter 962. The second step 954 may have a second diameter 964. The third step 956 may have a third diameter 966. The first diameter 962 may be greater than the second diameter 964 and the third diameter 966. The second diameter 964 may be greater than the third diameter 966. The fourth socket 348 may have a fourth diameter 968. The third diameter 966 may be greater than the fourth diameter 968.

The gasket 248 may be radially about the first seal 932 and in the outboard direction 912 of the first flange 244. The first seal 932 may be radially about and in surface sharing contact with the second land 948. The first bearing 744 and the band 942 may be fit to the first step 952, such as to have surface sharing contact with the first step 952. The first bearing 744 and band 942 may have an outer diameter that is approximately equal to the first diameter 962. The first bearing 744 may be sandwiched radially between the first land 946 and the first step 952. The first retainer ring 746 may be housed in the first socket 342 such as to be encircled via the second step 954 and the third step 956. The second seal 934 may be sandwiched radially between the third step 956 and the first retainer ring 746. The second seal 934 may have an extension 972 that extends radially outward from the second seal 934 and abuts a surface 974 of the third step 956. The third seal 936 may be positioned radially about the first land 946. The third seal 936 may abut the first retainer ring 746.

The first seal 932 may create a fluid seal (e.g., a fluid tight seal) between the first gasket 248 and the first half shaft 236, such as between the first gasket 248 and the second land 948. The first seal 932 may prevent lubricant from leaking or traveling in the outboard direction 912 of the first seal 932. The second seal 934 may create a fluid seal between the first flange 244 and the first retainer ring 746. The second seal 934 may prevent fluid from leaking or traveling in the inboard direction 914 of the second seal 934. The third seal 936 may create a fluid seal between the first retainer ring 746 and the first half shaft 236, such as between the first retainer ring 746 and the first land 946. The third seal 936 may prevent fluid from leaking or traveling in the inboard direction 914 of the third seal 936.

The second seal 934 may be positioned radially between the third step 956 and the first retainer ring 746. The third seal 936 may be positioned radially between the first retainer ring 746 and the third land 949.

It is to be appreciated, that the features and components housed via the first flange 244, such as the first seal 932, the second seal 934, and the third seal 936 may have symmetrical and mirrored seals housed by the second flange 254 of FIG. 2. The second seals of the second flange 254 described above for FIG. 7 may include seals symmetrical to and mirroring the first seal 932, the second seal 934, and the third seal 936. It is to be appreciated, that outboard for the second flange 254 may be closest to the second side 206 from the second flange 254 and inboard may be closest to the differential assembly 226.

Turning to FIG. 10, a ninth view 1000 of the beam 1022 is shown. The ninth view 1000 is a sectional view, showing the beam 1022 section via a sectional plane. The respective sectional plane of the ninth view 1000 may be parallel with a plane formed by the x-axis and z-axis of the reference axes 201.

The beam 1022 may be either the first beam 232 or the second beam 234 of FIG. 2. The beam 1022 may have a first platform 1032 at the top, a second platform 1034 at the bottom, and a web 1036 sandwiched between and connecting the first platform 1032 and the second platform 1034. The first platform 1032 may be the first platform 312 or the third platform 322 of FIG. 3. The second platform 1034 may be the second platform 314 or the fourth platform 324 of FIG. 3. The web 1036 may be the first web 316 or the second web 326 of FIG. 3. The beam 1022 may have a uniform cross-section lengthwise (e.g., in the y direction with respect to the reference axes 201). The first beam 232 and the second beam 234 may therein have a uniform cross-section lengthwise with respect to first length 290 and the second length 291 of FIG. 2.

The first platform 1032 may have a first surface 1042, and the second platform 1034 may have a second surface 1044. The first surface 1042 may be located at the top of the first platform 1032 and be a top surface for the beam 1022. Likewise, the second surface 1044 may be located at the bottom of the second platform 1034 and may be a bottom surface of beam 1022. The web 1036 may have a third surface 1046 and a fourth surface 1048, where the third surface 1046 is opposite the fourth surface 1048 with respect to the web 1036. The first surface 1042 and second surface 1044 may be flat. The third surface 1046 and the fourth surface 1048 may also be approximately flat, but connected to other surfaces via curves and may be continuous with said curves. For a first example, either the third surface 1046 may the first surface 318 of FIG. 3. For a second example the third surface 1046 may be the second surface 328 of FIG. 3. As an example, the beam 1022 may rest upon and make surface sharing contact with a plane formed via the x-axis and y-axis of the reference axes via the second surface 1044.

The first platform 1032 may also have fifth surface 1050 and a sixth surface 1052 that are below the first platform 1032. The fifth surface 1050 may be on the opposite side of the web 1036 from the sixth surface 1052. The second platform 1034 may have a seventh surface 1054 and an eighth surface 1056 that are above second platform 1034. The seventh surface 1054 may be on the opposite side of the web 1036 from the eighth surface 1056.

The fifth surface 1050 may have curvature with multiple points of inflection, curving upward toward and with a first rounded edge 1062, and curving downward toward the third surface 1046 with a first curve 1072. The first rounded edge 1062 may connect to and be contiguous with the first surface 1042. Likewise, the first rounded edge 1062 may connect to and be continuous with the fifth surface 1050. The first curve 1072 may connect to and be continuous with the third surface 1046 and the fifth surface 1050. The sixth surface 1052 may have curvature with multiple points of inflection, curving upward toward and with a second rounded edge 1064, and curving downward toward the fourth surface 1048 with a second curve 1074. The second rounded edge 1064 may connect to and be contiguous with the first surface 1042. The second rounded edge 1064 may connect to and be continuous with the first surface 1042 and the sixth surface 1052. The second curve 1074 may connect to and be continuous with the fourth surface 1048 and the sixth surface 1052.

The seventh surface 1054 may have curvature with multiple points of inflection, curving upward toward and with a third curve 1076, and curving downward toward and with a third rounded edge 1066. The third rounded edge 1066 may connect to and be contiguous with the second surface 1044. The third rounded edge 1066 may connect to and be continuous the seventh surface 1054. The third curve 1076 may connect to and be continuous with the third surface 1046 and the seventh surface 1054. The eighth surface 1056 may have curvature with multiple points of inflection, curving upward toward and with a fourth curve 1078, and curving downward toward and with a fourth rounded edge 1068. The fourth rounded edge 1068 may connect to and be contiguous with the second surface 1044. The fourth rounded edge 1068 may connect to and be continuous with the eighth surface 1056. The fourth curve 1078 may connect to and be continuous with the fourth surface 1048 and the eighth surface 1056.

The beam 1022 may have a depth 1082, a first thickness 1084, a width 1086, and a second thickness 1088. The depth 1082 may be a distance between the first surface 1042 and the second surface 1044. The first thickness 1084 may be the thickness of the web 1036 and a distance between the third surface 1046 and fourth surface 1048. The width 1086 may be a width of the first platform 1032 and second platform 1034. For example, the width 1086 may be the distance of the first surface 1042 from the first round 1062 to the second round 1064. Likewise, the width 1086 may be the distance of the second surface 1044 from the third round 1066 to the fourth round 1068. The second thickness 1088 may be a thickness of the first platform 1032 and second platform 1034. For an example, the second thickness 1088 may be a maximum distance between the first surface 1042 and the fifth surface 1050 or the sixth surface 1052. Likewise, the second thickness 1088 may be a maximum distance between the seventh surface 1054 and the eighth surface 1056.

For an example, the depth 1082 may be 3 inches, the first thickness 1084 may be 0.170 inches, the width 1086 may be 2.330 inches, and the second thickness 1088 may be 0.260 inches. For another example, the depth 1082 may be 4 inches, the first thickness 1084 may be 0.193 inches, the width 1086 may be 2.663 inches, and the second thickness 1088 may be 0.293 inches. For another example, the depth 1082 may be 5 inches, the first thickness 1084 may be 0.214 inches, the width 1086 may be 3.004 inches, and the second thickness 1088 may be 0.326 inches.

Turning to FIG. 11, it shows a method 1100 for manufacturing an axle assembly of the present disclosure, such as axle assembly 202 of FIG. 2.

Method 1100 starts at 1102, where the components and features of the axle assembly are gathered and arranged for fabrication and construction. For example, components such as the central plate or the beams, such as the cover 230 and the first and second beams 232, 224 of FIG. 2, may be secured via an adjustable brace or a fixture such that the components and features can be moved deliberately or held at rest for other components to be assembled on. Following 1102, the method 1100 may progress to 1104, where regions to be stamped, cut, or machined are marked. Regions that may be stamped, cut, or machined may include surfaces and volumes of wheel/brake flanges of the axle assembly, such as the first flange 244 and second flange 254 of FIG. 2. Features of the beams, such as the first shoulder 282 and the second shoulder 284, are pre-cut or pre-stamped before method 1100, such before acquiring the beams. Some regions marked during this step may be stamped cut or machined immediately during this step.

Following 1104, the method 1100 proceeds to 1106 where the mounting surfaces are marked for further construction of the assembly. The marked regions may include areas on surfaces of the beams that joints may physically couple to. For example, regions marked on the beams may include on areas the first beam 232 where the first joint 332 of FIG. 3 may be joined and an area on the second beam 234 where the second joint 334 of FIG. 3 may be joined. For this or another example, the marked regions on the beams may include: areas on the first beam 232 where one or more of the third joints 432 of FIG. 4 may join and areas on the second beam 234, and areas on the second beam 234 where one or more of the fourth joints 434 of FIG. 4 may join. The marked regions may also include area on the flanges where joints may be joined, such as areas that curve about circumference of the first flange 244 and the second flange 254 of FIG. 2 where portions of the first joint 332 and the second joint 334 may curve around and join to. The marked regions may also include areas on surfaces of the central plate, such as an area on surface 420 of the first appendage 286 and second appendage 288 of FIG. 2 where one or more of the third joints 432 and fourth joints 434 may join. During marking at 1104 and/or 1106, a region marked may be measured via measuring equipment. Features and dimensions of a measured component may be used as guides for measuring a region marked via measuring equipment. Regions may be marked within a minimum threshold of distance. For example, a region for mounting the a joint to a beam, such as the first beam 232 or second beam 234, may be marked at a horizontal distance from the start a surface of the shoulder, such as the first shoulder 282 or second shoulder 284, and a vertical distance from a platform of the of the beam, such as the first platform 312 or the second platform 314 for the first beam 232, or the third platform 322 or the fourth platform 324 for the second beam 234.

Method 1100 may continue to 1112, where a first beam is joined to a cover of the axle assembly. After 1112, method 1100 may continue to 1122 where a second beam is joined to a cover of the axle assembly. The cover may be a central structure for the first and second beams to mount to, such as a center plate. 1112 includes a plurality of sub-steps. 1112 begins at 1114 where at least a first joint is arranged between a first mounting surface of the cover and a first mounting surface of the first beam. However, there may one or more of the first joints. Each mounting surface for the one or more first joints may be a mounting area marked for joining in 1106. Each first joint is superimposed over and placed in surface sharing contact with the respective mounting regions of the cover and of the first beam. Method 1100 continues to 1116 where each first joint is welded to the respective mounting surfaces of the cover and the first beam. After welding to the respective mounting surfaces, each first joint may join the cover and the first beam. Similar to 1112, 1122 includes a plurality of sub-steps. 1122 begins at 1124 where at least a second joint is arranged between a second mounting surface of the cover and a second mounting surface of the second beam. However, there may one or more of the second joints. Each mounting surface for the one or more second joints may be a mounting area marked for joining in 1106. Each second joint is superimposed over and placed in surface sharing contact with the respective mounting regions of the cover and of the second beam. Method 1100 continues to 1126 where each second joint is welded to the respective mounting surfaces of the cover and the second beam. After welding to the respective mounting surfaces, each second joint may join the cover and the second beam.

Method 1100 continues to 1132, where a first brake flange is joined to the first beam. After 1132, method 1100 may continue to 1142 where a second brake flange is joined to the second beam. The first brake flange may be the first flange 244. The second brake flange may be the second flange 254. 1132 includes a plurality of sub-steps. 1132 begins at 1134, where at least a third joint is arranged between a third mounting surface of the first beam and the first brake flange, and around a fifth mounting surface of the first brake flange. 1132 continues at 1136, where the third joint is welded at the third mounting surface of the first beam and the fifth mounting surface of the first brake flange, joining the first brake flange to the first beam. Like 1132, 1142 includes a plurality of sub-steps. 1142 begins at 1144, where at least a fourth joint is arranged between a fourth mounting surface of the second beam and the second brake flange, and around a sixth mounting surface of the second brake flange. 1142 continues to 1146, where the fourth joint is welded at the fourth mounting surface of the second beam and the sixth mounting surface of the second brake flange, joining the second brake flange to the second beam. The third mounting surfaces of the first beam and the fifth mounting surfaces of first brake flange may be marked as mounting areas in 1106. Likewise, the fourth mounting surfaces of the second beam and the sixth mounting surfaces of second brake flange may be marked as mounting areas in 1106. Upon completion of 1132 and 1142, the first brake flanges, second brake flanges, the first beam, the second beam, and the cover may be constructed into a rigid structure.

Method 1100 continues to 1152, where the first and second brake flanges are machined. Some of the regions marked in 1104 may include regions of the first and second brake flanges that are machined in 1152.

After machining the brake flanges, method 1100 continues to 1162. At 1162 a differential carrier including a drivehead is fastened to the cover, such as the first housing 228 including the drivehead 240 of FIG. 2. The fastening the differential carrier to the cover assembles a differential assembly for the axle system, such as the differential assembly 226. When fastened the differential housing encloses a differential gearset, within the cover and the differential carrier, such as the differential gearset 720 of FIG. 7. The differential gearset and supporting elements, such as the first carrier 724 and the second carrier 726 of FIG. 7. 1162 includes a plurality of sub steps. 1162 begins at 1164, where a first flange of the differential carrier is placed in surface sharing contact with a second flange of the cover. The first flange may be the flange section 424 of FIG. 4 and the second flange may be the flange 229 of FIG. 2. Once in surface sharing contact, method 1162 continues to 1166, where first set of fits of the first flange and a second set of fits of the second flange are aligned such that the areas may be super imposed and the centerlines are approximately coaxial for the first fits and the second fits. For an example, the first sets of fits may be aligned with the second set of fits via movement of the differential carrier. For another example, the first set of fits may be aligned with the second set of fits via movement of the rigid structure that includes the cover. After 1166, method 1100 continues to 1168 where a plurality of complementary fasteners are extended through first set of fits and the second set of fits to fasten the first flange to the second flange, mounting the differential carrier to the cover. The fasteners may be bolts or other types of fasteners, such as the first fasteners 231 of FIG. 2, and may be threaded through the first set of fits and the second set of fits. After 1166 method 1100 leaves 1162. After 1162 method 1100 ends.

For an alternate example of method 1100, portions of the beams may have components, such as the first shoulder 282 and the second shoulder 284 of FIG. 2, may not be precut.

In this way, an axle system for an independent suspension system is convertible to an e-axle. Where a common gearbox and a drivehead may be fastened to and incorporated as a part differential assembly to drive and distribute torque to the axle system. An electric machine may drive couple the drivehead to enable electrification of the axle system. The common gearbox and the drivehead may be fastened to a preexisting central plate of the axle assembly.

In this way, the use of beams may reduce the amount of tools and the amount of machining for manufacturing the axle system. The axle half shafts may be supported via prefabricated beams in place of a banjo or another housing that may enclose and fluidly seal the axle half shafts between the differential assembly and the brake flanges of the axle system. Each of the prefabricated beams may be joined to a central plate of the axle assembly via one or more joints, where prefabricated beams may not be machined so that the common gearbox and the drivehead may physically couple to the central plate.

In this way, the complexity and quantity of materials used for manufacturing the axle system may also be reduced. As the axle system may be an axle assembly that does not include a banjo or another form axle housing for axle half shafts. A brake flange may physically couple to each of supported beams via joining, where each brake flange may receive, support, and partially house a portion of an axle half shaft. The housing of the differential and portions of the axle half shafts housed within may be fluidly sealed and lubricated. Likewise, the first and second brake flanges may be fluidly sealed, such that portions of the axle half shafts and other components housed within may receive lubrication. The portions of the axle half shafts not housed via the differential housing and the brake flanges may not be lubricated and may be open to the exterior of the axle assembly. In this way, the removal of the banjo housing or other housing that may surround the axle half shafts may reduce the weight of the axle system.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

Note that the example control and estimation routines included herein can be used with various engine, electric machine, transmission, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An axle assembly comprising:
a central cover including a shell section and a flange section;
a first beam;
a second beam;
a first wheel flange; and
a second wheel flange;
where the first beam and the second beam join to the central cover via welded joints at a first side and a second side opposite the first side, where a first shaft received via the first wheel flange is positioned along the first beam and is not fully covered between the first wheel flange and a differential assembly, and where the first beam and the second beam have a uniform cross-section lengthwise along lengths from the central cover to the first wheel flange and to the second wheel flange, respectively.

2. The axle assembly of claim 1, where a second shaft received via the second wheel flange is positioned along the second beam and is not fully covered between the second wheel flange and the differential assembly.

3. The axle assembly of claim 2, where the first beam has a first platform and a second platform connected via a first web, and the second beam has a third platform and a fourth platform connected via a second web, where the first and second shafts are exposed in a front longitudinal direction, and are covered in a rear longitudinal direction, and where surfaces at a top and bottom of the first platform, the second platform, the third platform, and the fourth platform are flat along the lengths from the central cover to the first wheel flange and to the second wheel flange.

4. The axle assembly of claim 3, where the first wheel flange joins to the first web, and the second wheel flange joins to the second web.

5. The axle assembly of claim 1, where the first wheel flange joins to the first beam via welding and a first joint.

6. The axle assembly of claim 5, where the first joint curves around and welds to first wheel flange.

7. The axle assembly of claim 1, where the first wheel flange is fluidly sealed, such that a portion of the first shaft is housed in a cavity of the first wheel flange that is fluidly sealed.

8. The axle assembly of claim 1, where the differential assembly fastens to the central cover.

9. The axle assembly of claim 8, where the differential assembly houses a gearbox and the gearbox fastens to the central cover via a plurality of fasteners.

10. The axle assembly of claim 9, where the central cover is a plate.

11. The axle assembly of claim 1, where the first beam joins to the central cover via at least a third joint, and where the third joint is welded to the first beam and the central cover.

12. The axle assembly of claim 11, where the second beam joins to the central cover via at least a fourth joint, and where the fourth joint is welded to the second beam and the central cover.

13. The axle assembly of claim 12, where the central cover includes a first appendage and a second appendage, where the first beam joins to the first appendage the via the third joint, and the second beam joins to the second appendage via the fourth joint, and where the first appendage and the second appendage are connected via a common surface that is continuous and level in a plane across the central cover.

14. A driveline assembly comprising:
an electric machine; and
an axle assembly, the axle assembly including:
a central cover including a shell section and a flange section;
a first beam;
a second beam;
a first wheel flange;
a second wheel flange; and
a differential assembly, a drivehead and a gearbox with a common housing,
where the first beam and the second beam join to the central cover via welding, where the common housing is fastened to the central cover, where a first shaft received via the first wheel flange is positioned along the first beam and is not fully covered between the first wheel flange and the differential assembly, where the differential assembly receives and fluidly seals the first shaft, where the first beam and the second beam have a uniform cross-section lengthwise respectively along a first length between the common housing and the first wheel flange and a second length between the common housing and the second wheel flange, and where the drivehead drive couples the gearbox.

15. The driveline assembly of claim 14, where the electric machine drive couples the drivehead to electrify the axle assembly.

16. The driveline assembly of claim 15, where the drivehead has a flange, where the flange physically couples to the electric machine via fastening, and where the electric machine and the flange abut and receive a plurality of fasteners.

17. The driveline assembly of claim 14, where a second shaft received via the second wheel flange is positioned along the first beam, and the second shaft is not fully covered between the second wheel flange and the differential assembly.

18. An axle assembly comprising:
a central cover, including a first flange, and a first appendage;
a first beam, including a first platform and a second platform joined via a first web, and a first shoulder share a first surface with the first web;
a second beam;
a first wheel flange, where a first joint is welded to the first wheel flange, and where the first joint curves around a first portion of the first wheel flange;
a second wheel flange;
a first shaft;
a second shaft; and
a differential assembly, including a differential gearset, a gearbox, and a housing, where the housing houses the gearbox and a drivehead;
where the first wheel flange joins to the first beam via the first joint via welding; where the first shoulder joins to the first appendage via at least a third joint via welding; where the central cover fastens to the housing via a plurality of first fasteners fastening the first flange to a second flange of the housing; where the first wheel flange receives the first shaft, and the second wheel flange receives the second shaft; where the first shaft is positioned along the first beam and is not fully covered; where the first flange is fluidly sealed from an exterior and against the first shaft via a plurality of first seals; where the housing receives the first shaft via a first tube; where the housing is fluidly sealed from the exterior via a first seal; where the first seal fluidly seals the first shaft with the first tube; where the drivehead drive couples the differential gearset via the gearbox, and the differential gearset drive couples the first shaft and the second shaft; where an electric machine drive couples the drivehead; where a first cavity of the central cover and a second cavity of the housing house the differential gearset; where the differential gearset includes a first carrier and a second carrier that support a differential case; and where the first carrier supports a first side gear via a plurality of first bearings, and the second carrier supports a second side gear via a plurality of second bearings.

19. The axle assembly of claim 18, where the central cover includes a second appendage; where the second beam includes a third platform and a fourth platform joined via a second web, and a second shoulder shares a second surface with the second web; where the second shoulder joins to the first appendage via at least a fourth joint via welding; where a second joint is welded to the second wheel flange; where the second joint curves around a second portion of the second wheel flange; where the second wheel flange joins to the second beam via the second joint via welding; where the second shaft is positioned along the second beam and is not fully covered between the second wheel flange and the housing; where the second flange is fluidly sealed from the exterior and against the second shaft via plurality of second seals; where the housing receives the second shaft via a second tube; where the housing is fluidly sealed from the exterior via a second seal; and where the second seal fluidly seals the second shaft with the second tube.

20. The axle assembly of claim 19, where the first shoulder joins to the first appendage via a plurality of third joints, and the second shoulder joins to the second appendage via a plurality of fourth joints.

* * * * *